July 8, 1958     J. H. GRUVER     2,842,615
PRINTING MACHINES

Filed Jan. 8, 1957     17 Sheets-Sheet 1

INVENTOR.
JOHN H. GRUVER
BY
Wallace and Cannon
Attys.

July 8, 1958  J. H. GRUVER  2,842,615
PRINTING MACHINES
Filed Jan. 8, 1957  17 Sheets-Sheet 3
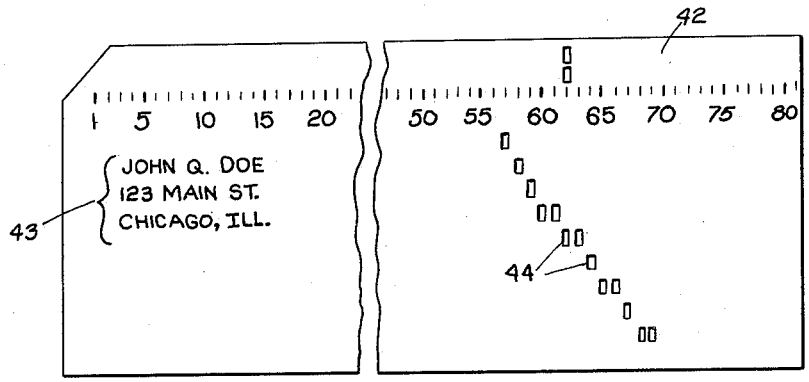
_FIG. 3
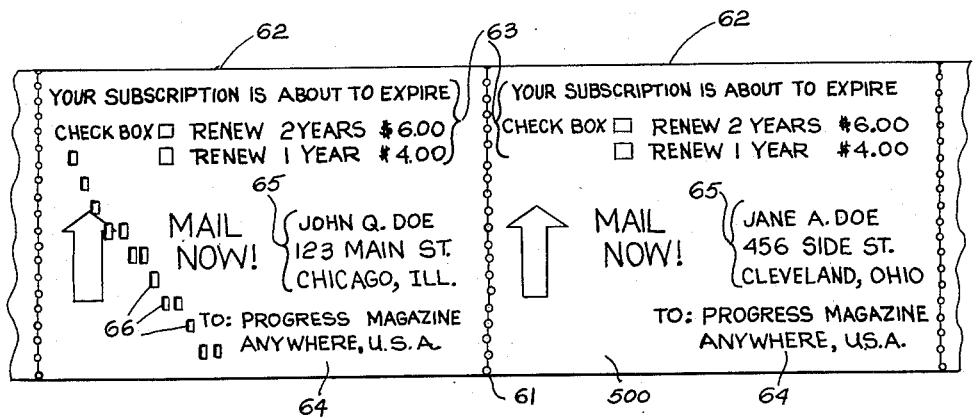
_FIG. 4
INVENTOR.
JOHN H. GRUVER
BY
Wallace and Cannon
Att'ys.

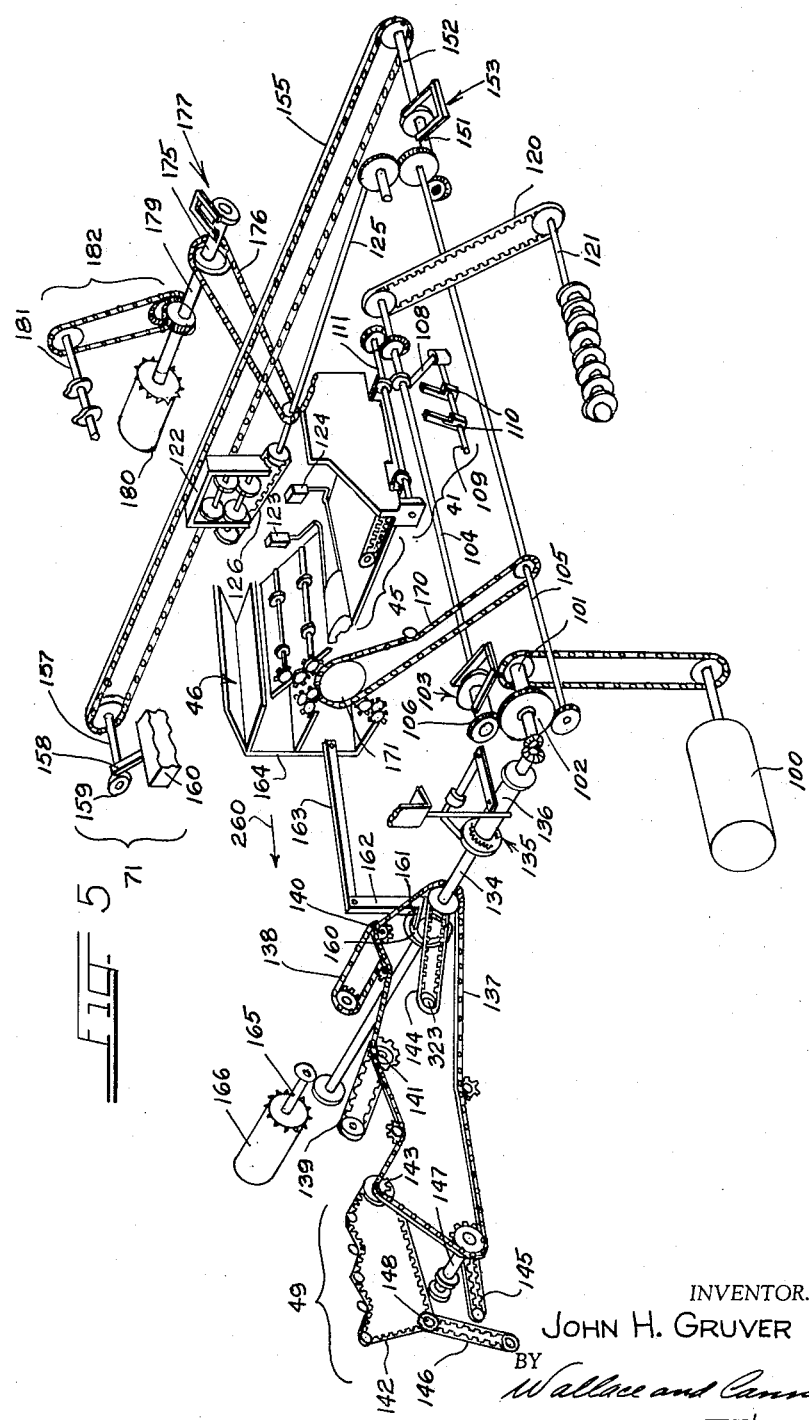

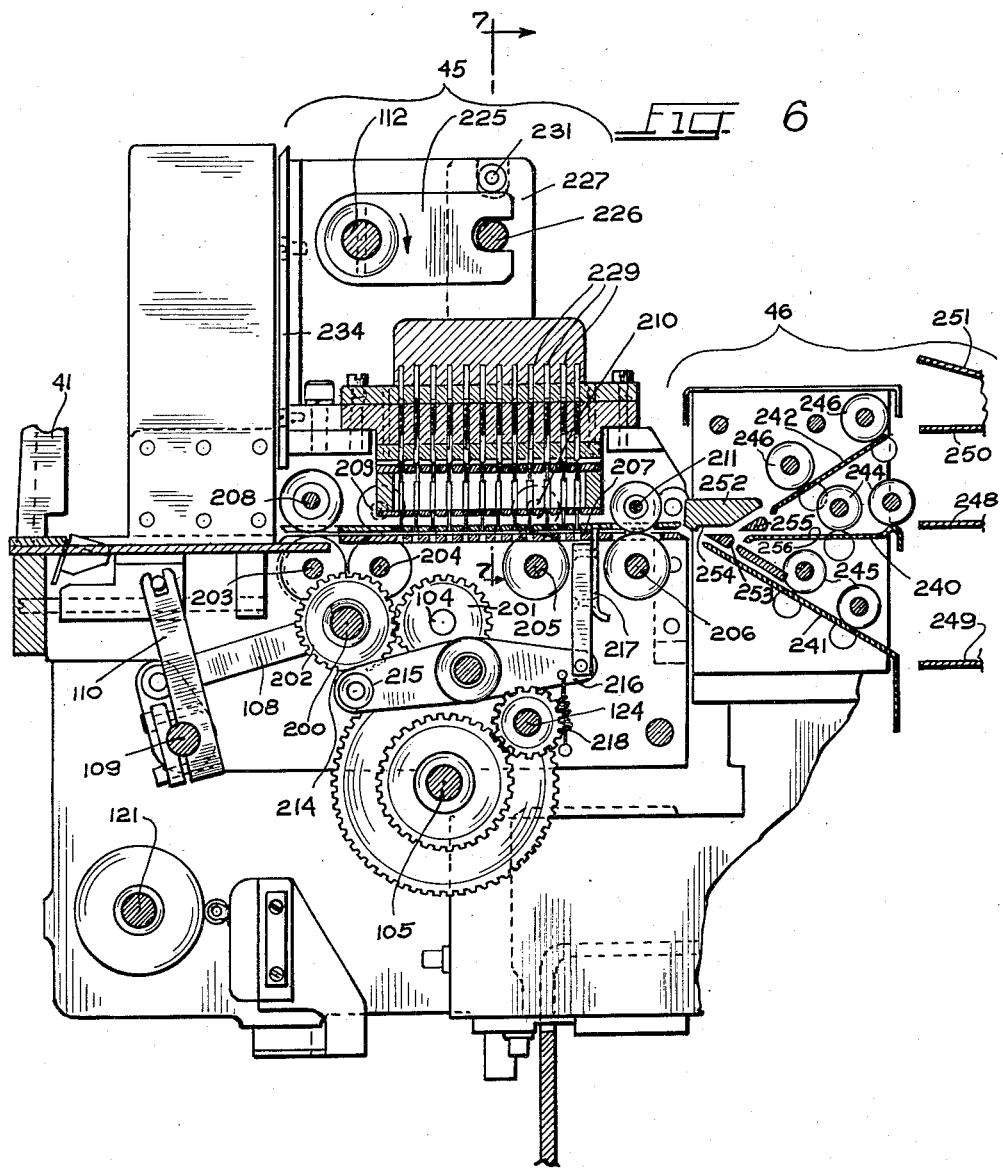

July 8, 1958 J. H. GRUVER 2,842,615
PRINTING MACHINES
Filed Jan. 8, 1957 17 Sheets-Sheet 6

INVENTOR.
JOHN H. GRUVER
BY
Wallace and Cannon
ATT'YS.

July 8, 1958 J. H. GRUVER 2,842,615
PRINTING MACHINES
Filed Jan. 8, 1957 17 Sheets-Sheet 7
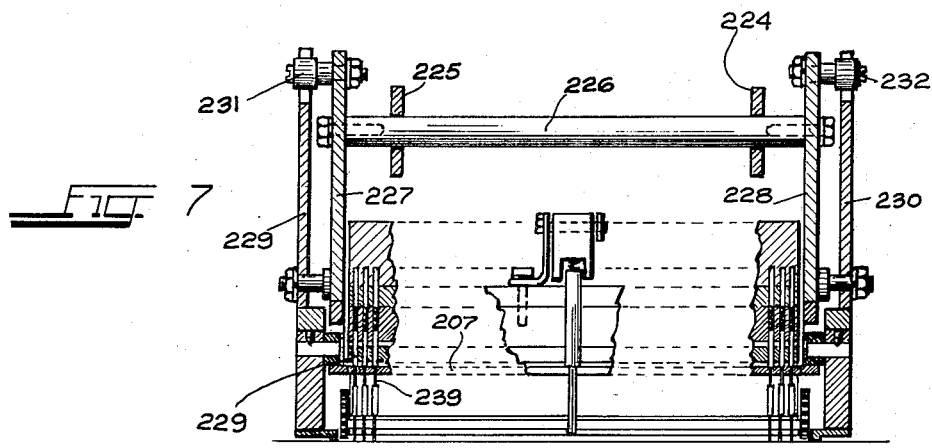
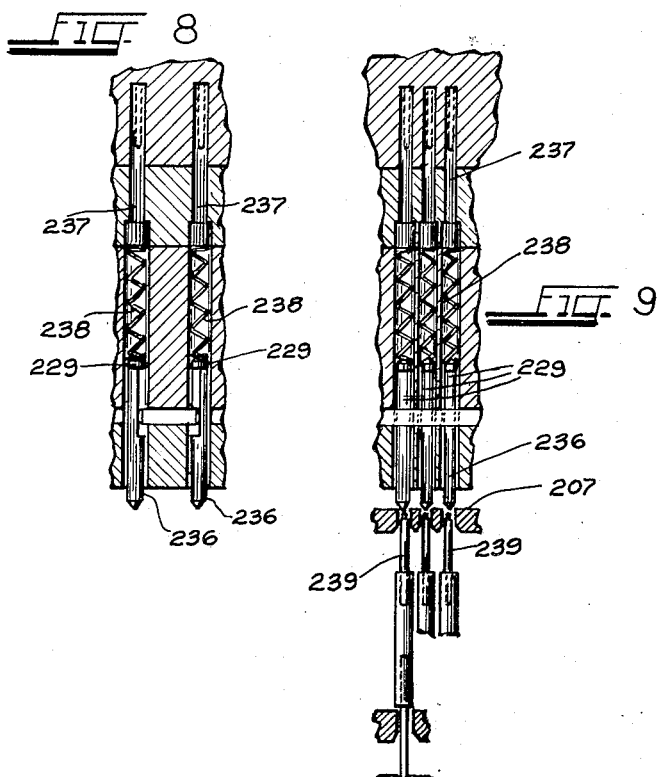
INVENTOR.
JOHN H. GRUVER
BY
Wallace and Cannon
Att'ys.

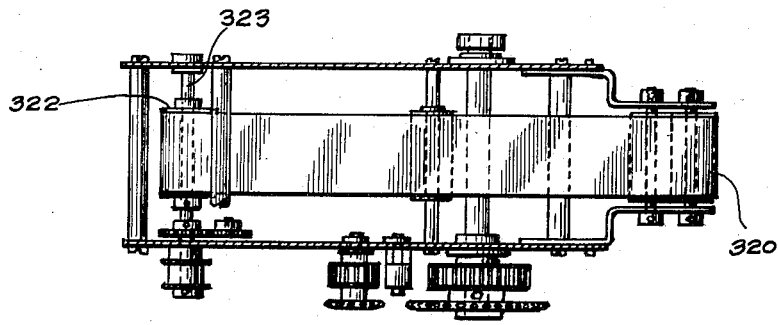
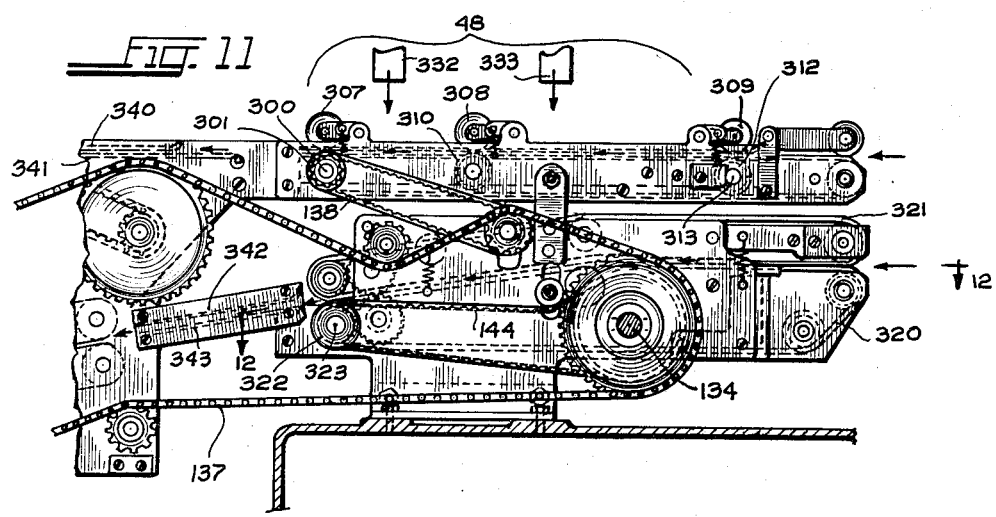
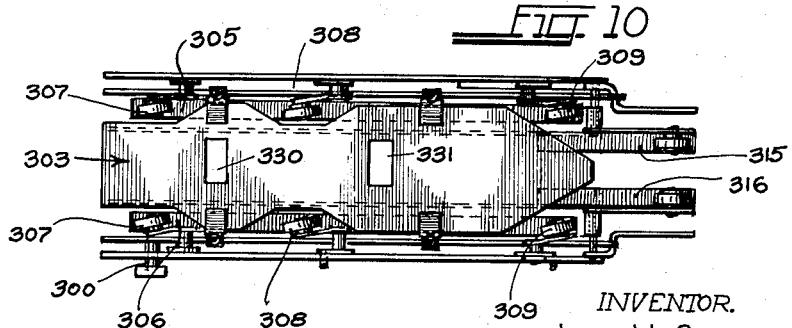

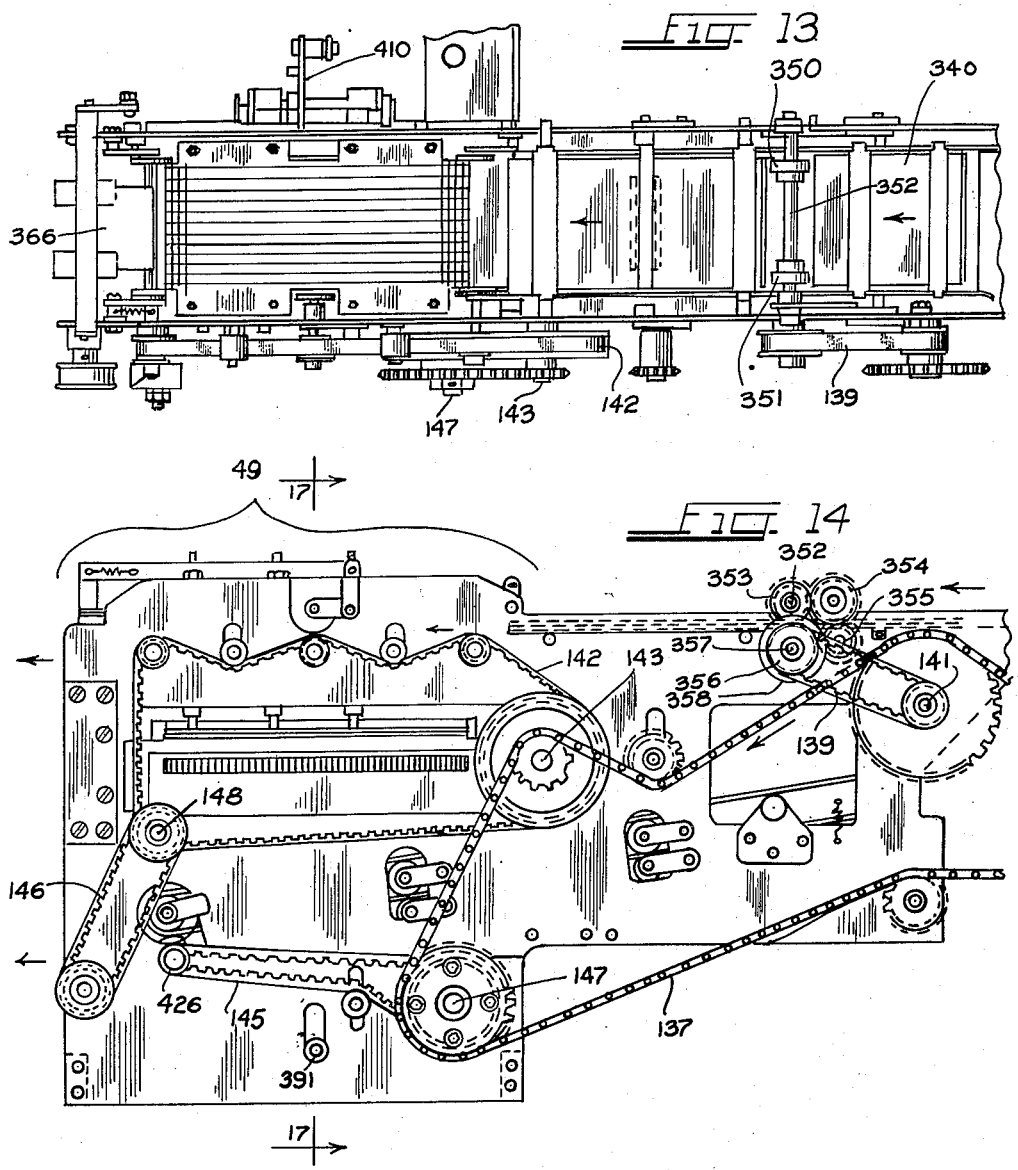

July 8, 1958

J. H. GRUVER 2,842,615

PRINTING MACHINES

Filed Jan. 8, 1957

INVENTOR.
JOHN H. GRUVER
BY
Wallace and Cannon
ATT'YS.

July 8, 1958  J. H. GRUVER  2,842,615
PRINTING MACHINES

Filed Jan. 8, 1957  17 Sheets-Sheet 11

INVENTOR.
JOHN H. GRUVER
BY
Wallace and Cannon
Att'ys.

July 8, 1958   J. H. GRUVER   2,842,615
PRINTING MACHINES
Filed Jan. 8, 1957   17 Sheets-Sheet 12
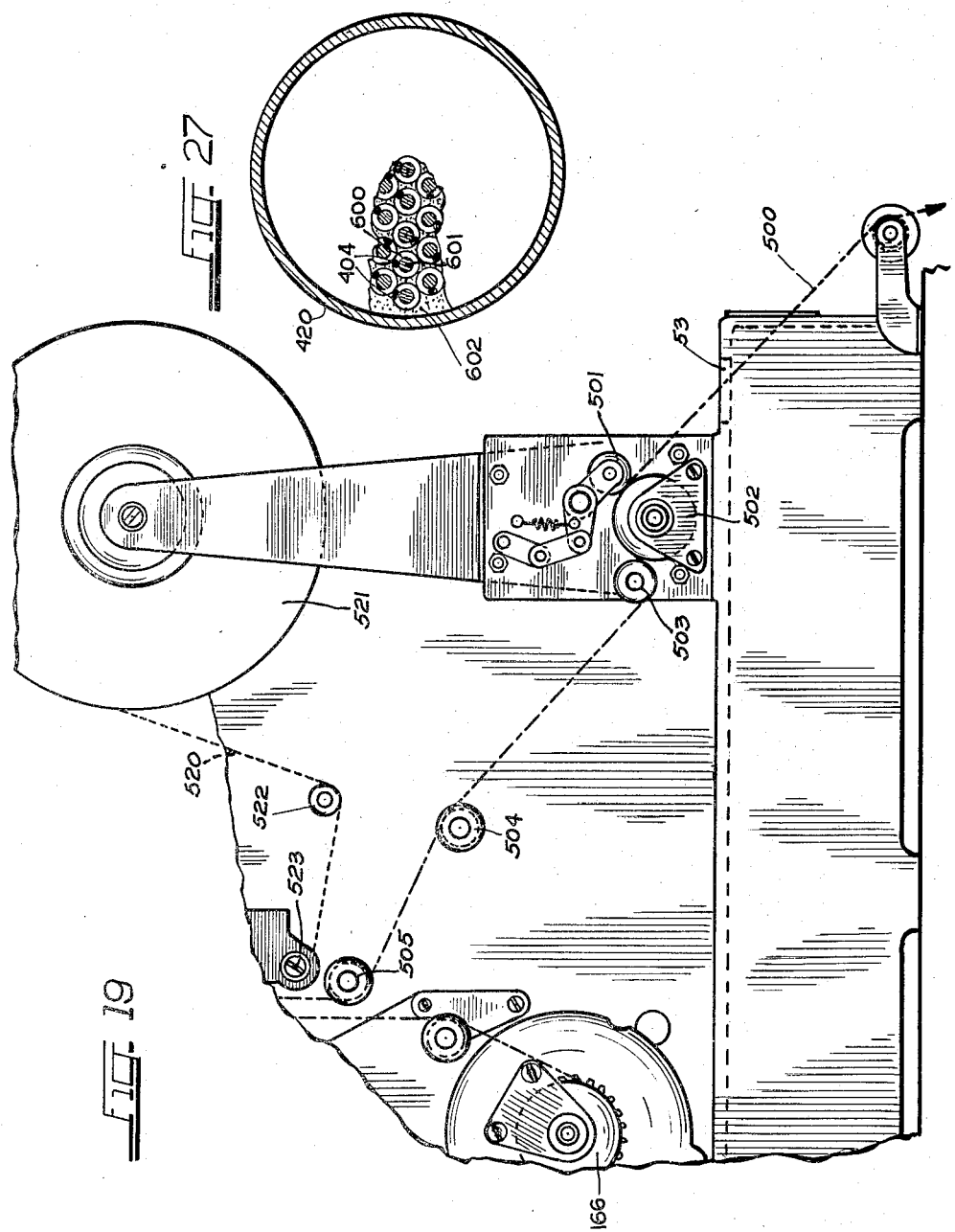
INVENTOR
JOHN H. GRUVER
BY Wallace and Cannon
Att'ys.

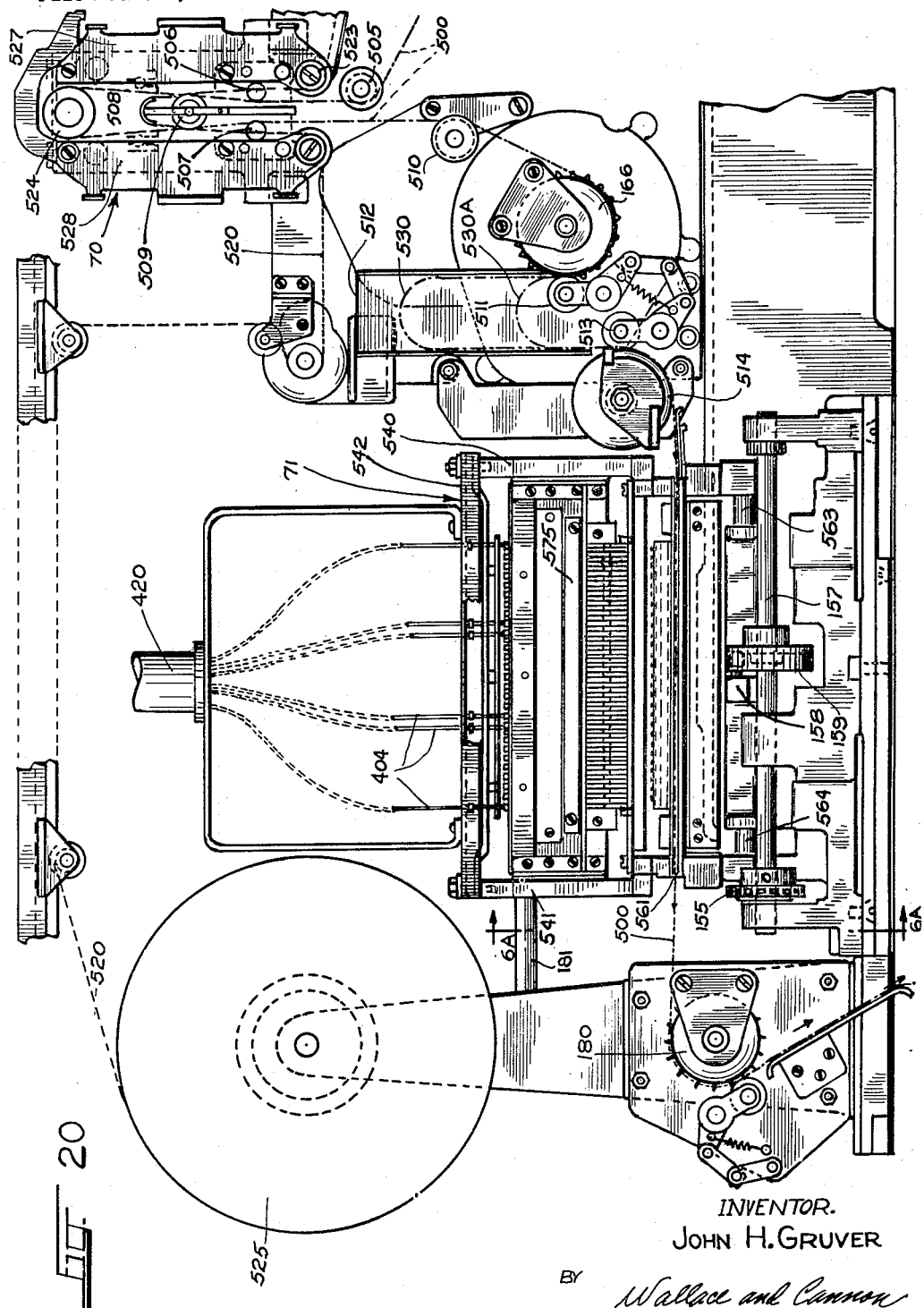

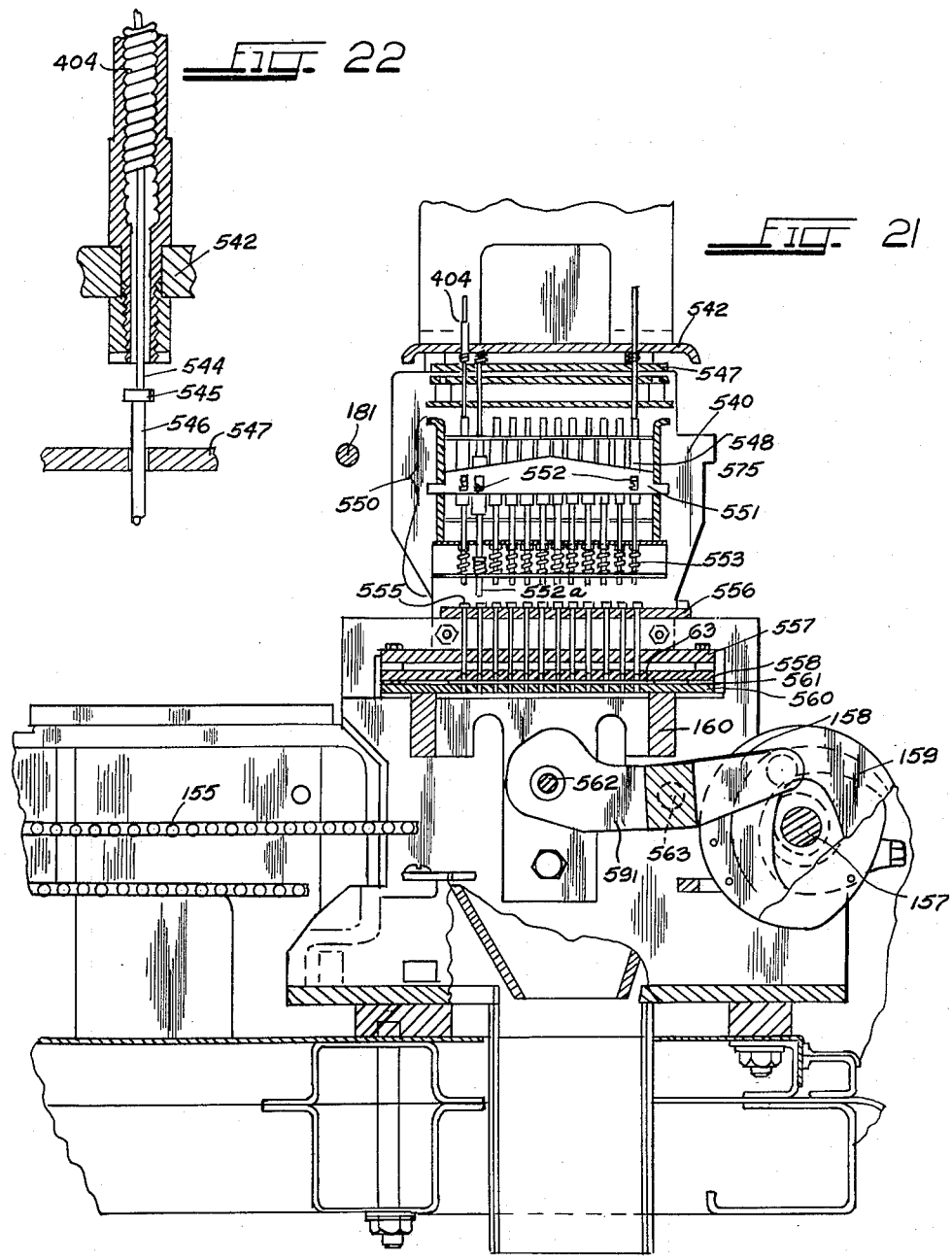

July 8, 1958
J. H. GRUVER
2,842,615
PRINTING MACHINES
Filed Jan. 8, 1957
17 Sheets-Sheet 15
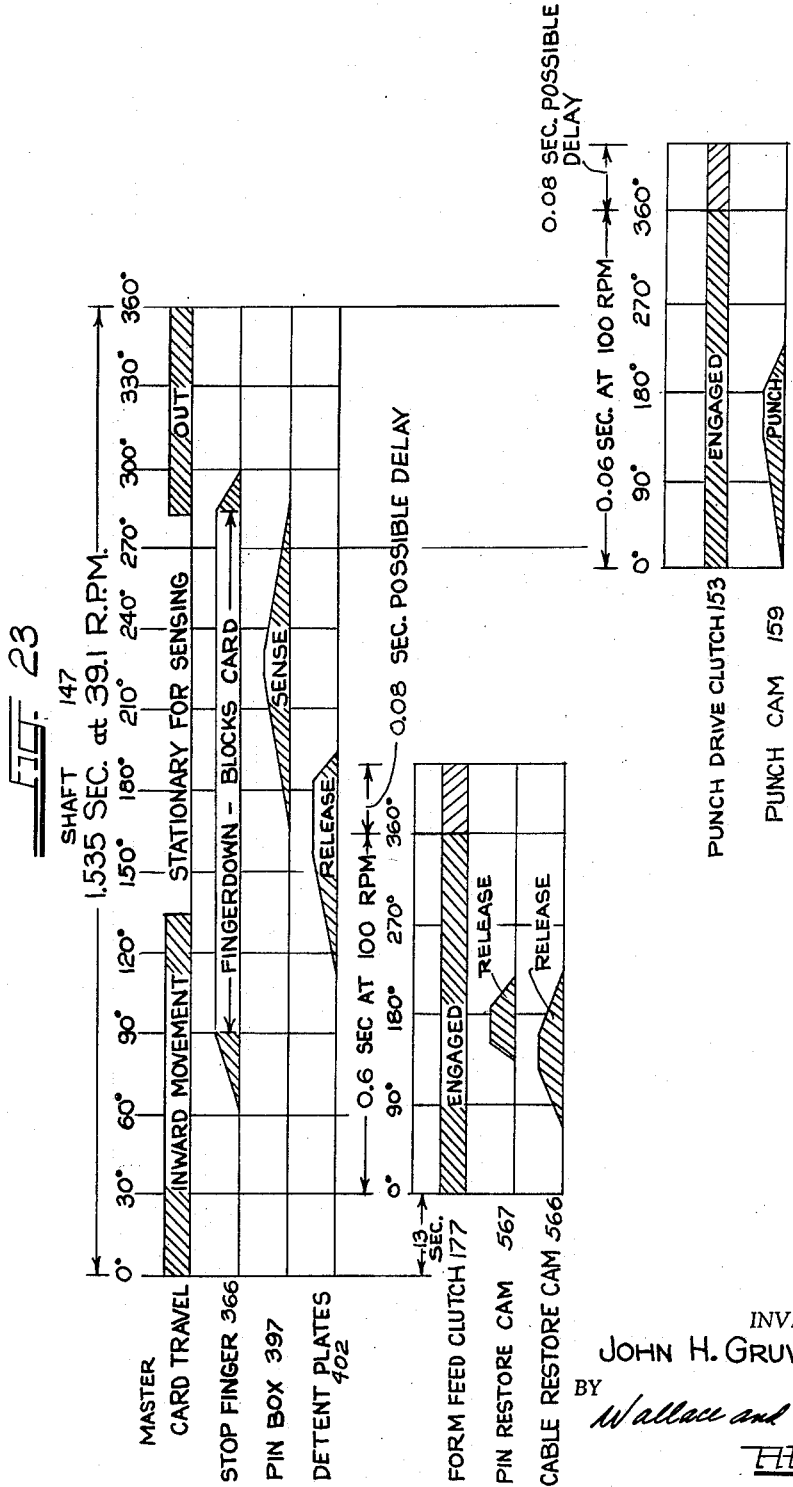
INVENTOR.
JOHN H. GRUVER
BY
Wallace and Cannon
ATT'YS.

July 8, 1958 J. H. GRUVER 2,842,615
PRINTING MACHINES
Filed Jan. 8, 1957 17 Sheets-Sheet 16
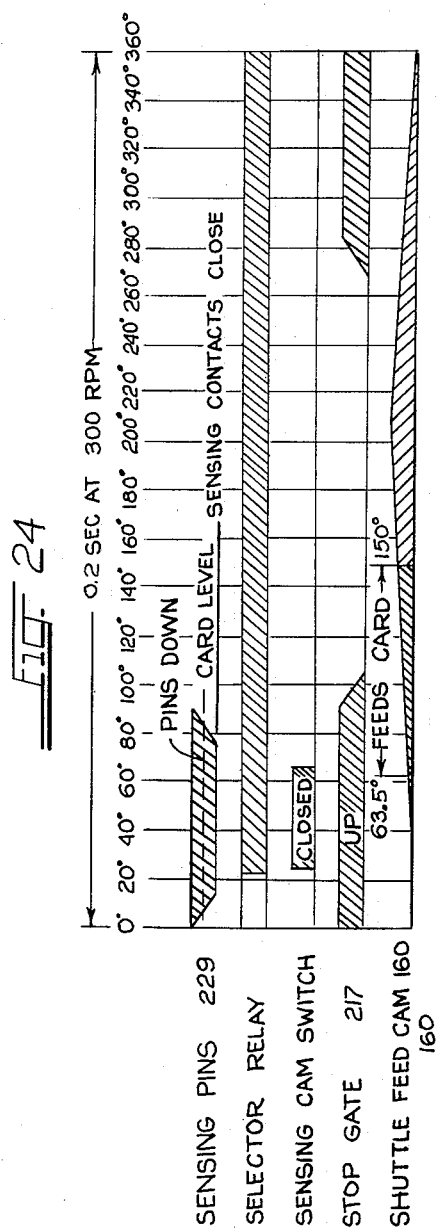
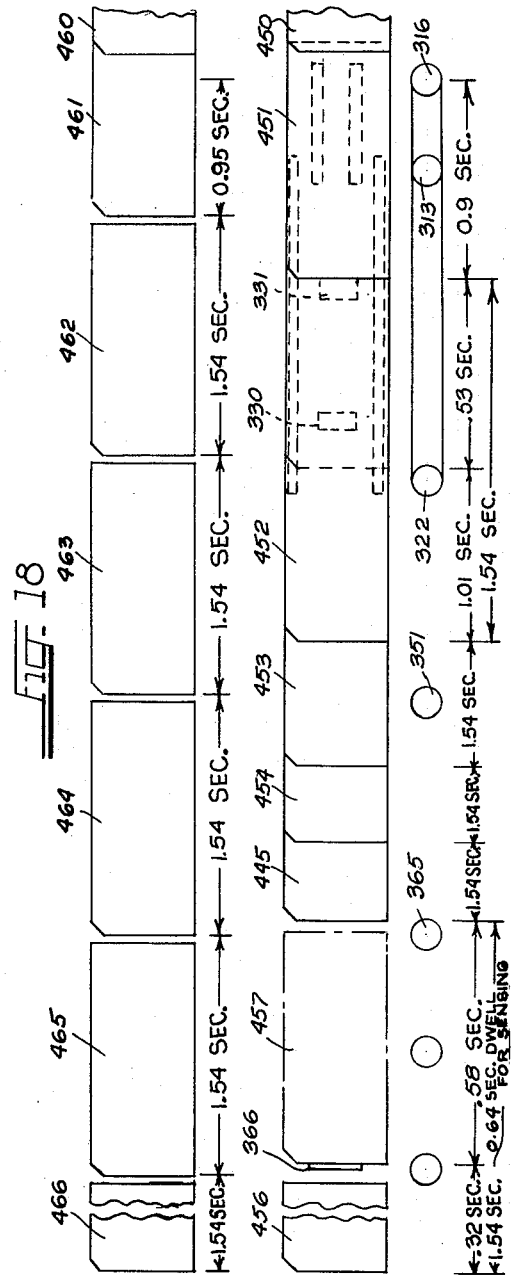
INVENTOR.
JOHN H. GRUVER
BY
Wallace and Cannon
Att'ys.

July 8, 1958 J. H. GRUVER 2,842,615
PRINTING MACHINES
Filed Jan. 8, 1957 17 Sheets-Sheet 17

INVENTOR.
JOHN H. GRUVER
BY Wallace and Cannon
Att'ys.

United States Patent Office 2,842,615
Patented July 8, 1958

2,842,615

PRINTING MACHINES

John H. Gruver, Cleveland Heights, Ohio, assignor to Addressograph - Multigraph Corporation, Cleveland, Ohio, a corporation of Delaware Application January 8, 1957, Serial No. 633,157

23 Claims. (Cl. 178—6.6)

This invention relates to printing machines and more particularly to printing machines useful in relatively complex large-scale business record operations.

In many business operations, large numbers of magazines, letters, bills, and/or other material are addressed and mailed to individual customers or clients by means of specialized printing machines. For example, subscription fulfillment for nationally-distributed magazines frequently entails the addressing of hundreds of thousands of magazines. The printing machines employed in operations of this general type are controlled by master records, usually in the form of record cards which carry the necessary information relating to the name and address of the party to receive the magazine, the subscription status, and other similar pertinent information. Some of this information may be in the form of holes punched in the master record card in accordance with a predetermined code; other information is frequently carried on the card in the form of printed matter. The punched-hole information, in a typical operation, may be utilized to select and sort individual record cards from a relatively large group of cards; the printed information on the selected cards may then be reproduced on address labels, printed forms, or other business instruments by facsimile or other means to complete the desired addressing operation. A typical facsimile system which may be utilized in a business printing machine of this type is set forth in detail in Patents 2,510,200, 2,571,720, 2,571,- 785, and 2,578,307 issued to Russel G. Tompson. Printing machines of the kind with which the invention is concerned are described and claimed in my co-pending applications Ser. No. 347600, filed April 8, 1953 and Ser. No. 465,612, filed October 29, 1954. The printing machine described in the latter application, for example, sorts the master record cards into several different categories, only one of which is to be reproduced in addressing magazines or other material. The machine automatically transmits the cards selected for printing one by one past a facsimile scanning station and the mailing addresses imprinted upon the cards are automatically reproduced on an address strip.

In many instances, it is desirable to use the master record cards in the mailing of promotional material or other business instruments only incidentally related to the instruments with which the cards are normally associated. For example, it may be desirable periodically to urge the subscribers to a magazine to renew their subscriptions or to advise policy holders in an insurance company about the availability of new and/or different types of coverage afforded by the insurance company. In many instances, it is hoped that the subscribers, policy holders, or other customer or client will reply to the promotional mailing and quite frequently the instrument mailed out includes, as an integral part of its promotional message, some provision for making the desired reply by returning the instrument itself to the originator.

In an operation of this sort, where the instrument mailed out is to be returned to the originator, it is frequently necessary to sort the returned instruments into several different categories. For example, in the case of a magazine subscription application, the instrument may afford means for ordering a renewal of an existing subscription and consequently may provide for initiation of the renewed subscription at one of a number of different dates. In these and similar instances, classification of the instruments may be determined by the basic information concerning the customer or client which was incorporated in the original punched-hole data in the master record card from which the instrument was prepared. Consequently, if this same information is incorporated in the instrument utilized in the promotional mailing, it may be employed to permit machine sorting of the instruments after they have been returned to the originator.

In order to afford maximum efficiency in the sorting of returned instruments of the type described above, it is desirable that the customer identification and other information be applied to the instrument at the time that it is mailed out. This of course could be accomplished by suitable machines as a separate operation; substantially greater efficiency and accuracy may be obtained, however, if the information is encoded upon the instrument at the time the instrument is originally prepared by the printing machine. Moreover, in order to avoid any necessity for additional sorting and selecting equipment, it is highly desirable that the information be encoded upon the instrument in the same form as it appears on the original master record card.

It is a primary object of the invention, therefore, to afford a new and improved printing machines which, in addition to its normal printing function, is adapted to encode a printed instrument with additional information in the form of punched holes or similar indicia.

Another and more specific object of the invention is a printing machine which automatically analyzes the information on a master record card to determine whether or not that card should be utilized in printing a business instrument and which subsequently applies all of the information carried by the master record card to that business instrument.

A further object of the invention is a printing machine adapted to apply punched-hole information to business instruments after the printing thereof in which the provision for information punching of the instrument is relatively simple and economical in construction and which requires a minimum of modification of the basic printing machine.

A more specific object of the invention is a new and improved record instrument transport system for a printing machine that reproduces both printed and coded data, which transport system affords a convenient and economical means for synchronizing the analyzing and reproducig operations of the machine.

Another object of the invention is a new and improved record instrument transport system which materially reduces the overall size of a combination printing and punching machine.

An additional object of the invention is the provision of new and improved means for operatively connecting a sensing or analyzing station in a printing machine with a punching device also included in the machine.

Other and further objects of the present invention will be apparent from the following description and claims and are illustrated in the accompanying drawings which, by way of illustration, show a preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

Fig. 3 illustrates a typical record card which may be employed in controlling the printing machine of Figs. 1 and 2;

Fig. 4 shows a typical business instrument prepared by the printing machine;

Fig. 5 is a schematic diagram of the mechanical driving system of the printing machine of Figs. 1 and 2;

Fig. 6 is a sectional elevation view of the selector mechanism of the printing machine;

Fig. 7 is a sectional view of the selector mechanism of Fig. 6 taken along line 7—7 therein;

Fig. 8 is an enlarged sectional view of a portion of the selector mechanism;

Fig. 9 is an enlarged sectional view of another portion of the selector mechanism;

Fig. 10 is a plan view of the master card transport of the printing machine in the portion thereof adjacent the facsimile scanning station;

Fig. 11 is an elevation view of the master card transport adjacent the facsimile scanning station;

Fig. 12 is a sectional view taken along line 12—12 in Fig. 11 and showing part of the skip card transport of the printing machine;

Fig. 13 is a plan view of the master print card transport of the printing machine in the portion thereof adjacent the punch-sensing station and also shows a portion of the punch-sensing mechanism;

Fig. 14 is an elevation view of the portion of the printing machine shown in Fig. 13;

Fig. 18 is a timing chart illustrating the movement of master record cards through the scanning and punch-sensing stations of the machine;

Fig. 19 is an elevation view, on an enlarged scale, of a portion of the printing mechanism of the printing machine;

Fig. 20 is an elevation view of the printing and punching mechanisms of the printing machine;

Fig. 21 is an end elevation, partly in cross section, of the printing machine showing the punching unit;

Fig. 22 is an enlarged sectional view of an individual punch unit included in the apparatus of Fig. 19;

Fig. 23 is a timing chart showing the sequence of operations in the punch and punch-sense stations of the machine;

Fig. 24 is a timing chart for the initial sensing and selector stations of the machine;

Fig. 27 is a sectional view of an information-translating structure interconnecting the punch-sense and punch units of the machine.

*General description*

Figure 1:
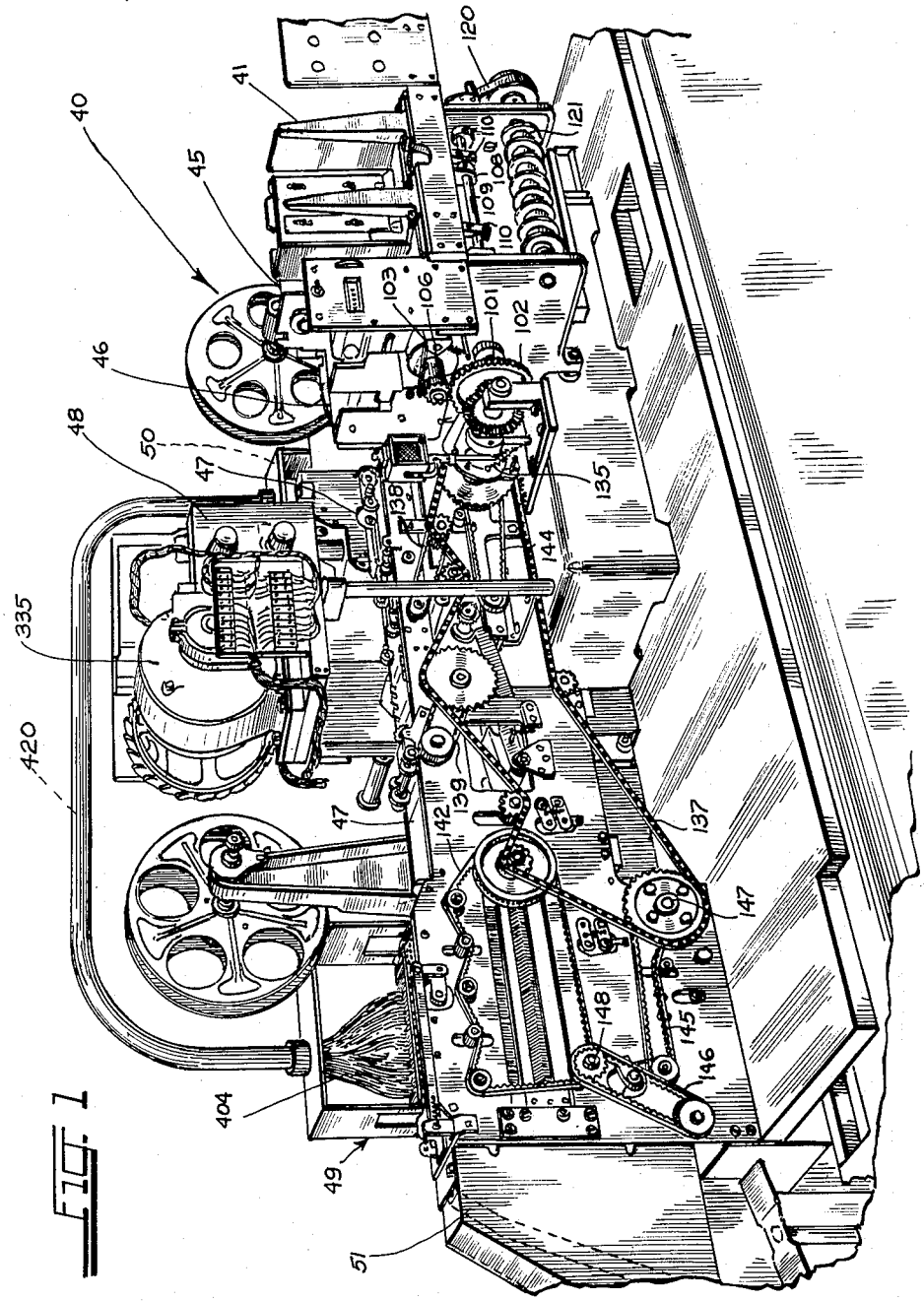
Fig. 1 is a perspective view of a printing machine constructed in accordance with one embodiment of the invention, showing the instrumentalities of the machine utilized in selecting and analyzing specific ones of a series of master record cards.
Figure 2:
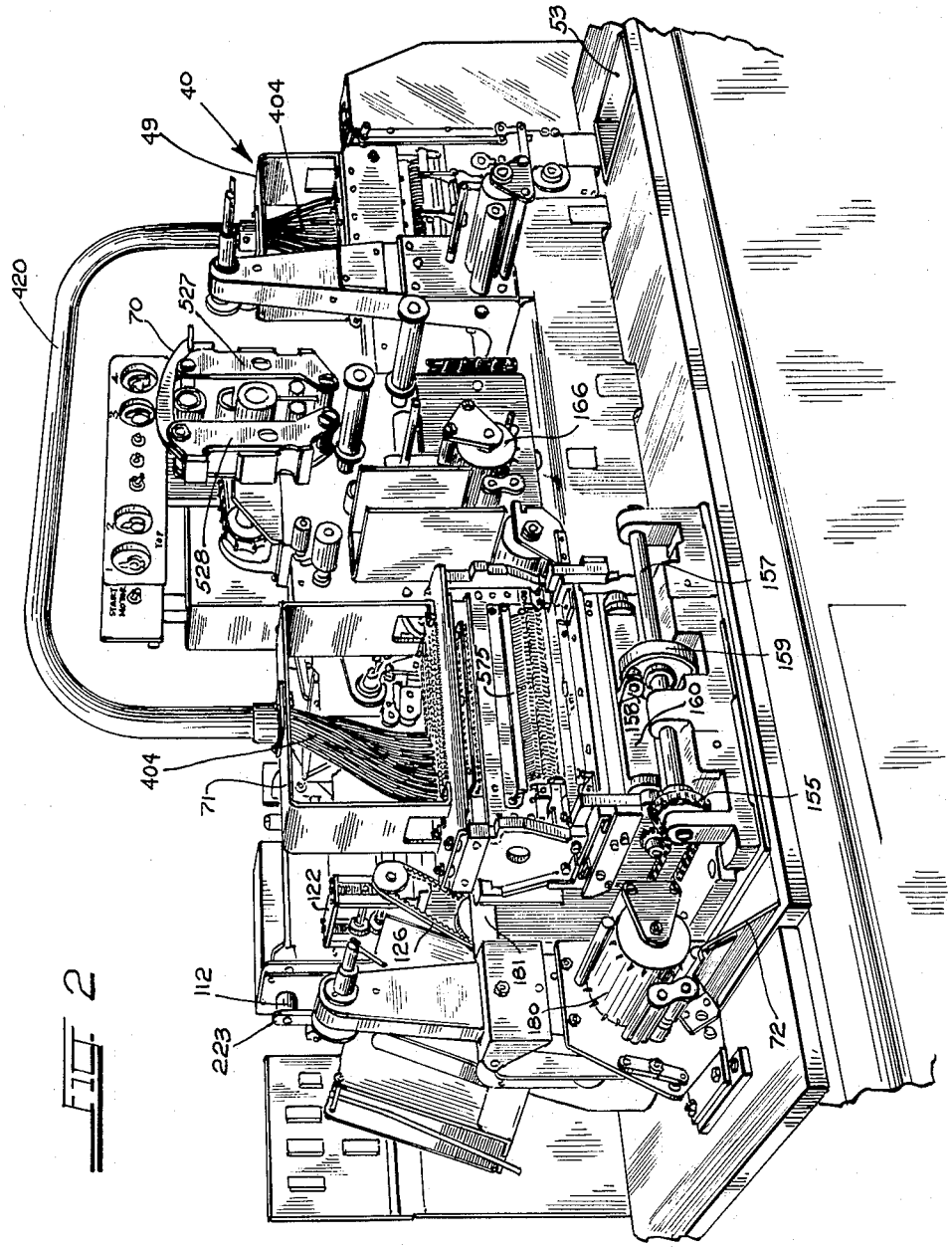
Fig. 2 is a perspective view showing the opposite side of the printing machine of Fig. 1, including the printing and punching mechanisms of the machine.

The printing machine 40 illustrated in Figs. 1 and 2, which comprises one embodiment of a printing machine constructed in accordance with the inventive concept, includes a magazine 41 for receiving a quantity of master record cards or other suitable record instruments. These master record or control instruments may, for example, be of the form illustrated in Fig. 3, which shows a master record card 42 upon which is imprinted certain information such as the name and address of a magazine subscriber, insurance policy holder, or other customer or client as indicated at 43; this material is sometimes referred to hereinafter as the image data of the record instrument. In addition, record card 42 may be provided with a series of apertures or punched holes 44 formed in accordance with a predetermined code and which relate to additional information concerning the subscriber or policy holder. For example, punched holes 44 may represent information concerning the length of a subscription, the expiration date of the subscription, and other similar pertinent information in the case of a magazine subscriber or may relate to similar information concerning a policy holder in an insurance company. In accordance with known techniques, the punched-hole information may be encoded in accordance with a six digit code, a twelve digit code, or any other suitable code; this information is sometimes referred to hereinafter as the identification data of the record instrument.

Printing machine 40 further includes a sensing station 45 which is adapted to analyze the punched-hole information 44 in the individual record instruments 42 and to determine whether or not the image data 43 on a given card is to be reproduced upon one of the business instruments prepared by the machine. For example, in a given promotional mailing relating to magazine subscriptions, it may be desirable to mail a particular type of promotional instrument only to those subscribers having subscriptions which will terminate within a given six month period. Under these circumstances, the punched hole information 44 in the individual record cards 42 is analyzed by the sensing station apparatus 45 to determine which instruments represent subscribers falling into this category and to segregate cards of this classification from the remainder of the cards. In the course of the same operation, moreover, it may be desirable to remove some of the record cards entirely from the record stack and to retain other cards in the record collection even though they are not employed in the printing operation. The information sensed by station 45 is employed to control a selector mechanism 46 which separates the record cards according to two or more orders or categories; in the illustrated embodiment, selector 46 segregates the cards into "print," "skip," and "reject" categories.

Each time a record card to be printed is advanced into the selector mechanism 46, that mechanism is actuated to advance the card into a card transport generally indicated at 47. At the same time, the "skip" cards, which are not to be utilized in the printing operation but are to be retained in the record files, are advanced from the selector mechanism 46 to a second transport which will be described hereinafter. Each card in the "print" category is then advanced past the scanning or image analysis station 48 of a facsimile reproduction system. In scanning station 48, the printed information 43 on the card is analyzed in the manner described in the aforementioned Tompson patents to develop a facsimile control signal which is utilized in the printing of business instruments, as will be described more completely hereinafter.

Preferably, movement of the "print" order record cards is not interrupted during analysis by scanning station 48; rather, scansion is accomplished while movement of the card continues. The continuing movement of the card through transport 47 subsequently brings the card to a punch-sensing or identification analysis station 49. At station 49, the punched-hole information borne by the card is again analyzed in a manner somewhat similar to that employed in conjunction with the sensing station 45. In this instance, however, the punched-hole information is not analyzed for the purpose of selecting certain record cards from a relatively large group; rather, the information adduced in sensing station 49 is utilized to control a punch unit 50 located at the opposite end and on the opposite side of the printing machine. In this instance, moreover, it is desirable that the movement of the card be halted momentarily in order to permit sensing station 49 to operate efficiently, as will be made apparent from the description of this portion of the printing machine included hereinafter. After the card has been analyzed in sensing station 49, it is discharged into a hopper 51 along with other record cards which have not been utilized in the printing operation.

Referring to Fig. 2, it is seen that the base of printing machine 40 includes an opening 53 through which a print-receiving web of business instrument forms may be fed from a supply chamber, the supply chamber not being shown in the drawing. The business instruments in the web may, for example, take the form shown in Fig. 4, which shows a strip or web 500 of forms suitable for use in the promotion or solicitation of magazine subscription orders. Web 500 is preferably formed from relatively heavy paper stock suitable for use in punched-hole business machines and may include a series of individual fold lines 61 formed in conventional manner by perforation of the paper strip. Each of the individual business instruments 62 included in the web is imprinted with certain information, usually of a promotional or solicitation nature, as indicated in the drawing at 63; in the illustrated forms, the printed legend includes an admonition that the recipient's magazine subscription is about to expire along with provisions for advising the publisher with respect to renewal for a specified term. Generally speaking, it is usually preferable that the solicitation message 63, along with the mailing address of the publisher indicated at 64, be printed upon the individual sections 62 of web 500 before the forms are processed in printing machine 40, although this is by no means essential and the advertising or promotional message may be applied to the web after it has passed through printing machine 40.

Printing machine 40 is intended to accomplish two objectives with respect to each of the business instruments 62. The printing machine is utilized to imprint upon each of the individual forms an address 65 corresponding to the address or image data 43 on one of the master record instruments 42 (see Fig. 3). The printing machine is also employed to punch in each of the forms 62 a series of openings 66 which are arranged in the same pattern as the coded identification data 44 of the master record card. Consequently, after the forms 62 comprising web 500 have been processed in printing machine 40, they each bear both printed and punched information duplicating that carried by one of the master record cards 42.

The basic operating units or stations in that portion of printing machine 40 illustrated in Fig. 2 comprise a facsimile reproduction station 70, the operation of which is controlled from scanning station 48 of Fig. 1, and an information punch unit 71 which is controlled in operation by the punch-sense mechanism 49 of Fig. 1. After the forms have been imprinted with an address in printing station 70 and punched with additional information in punching unit 71, they are conveyed to a receiving hopper (not shown) in the base of the machine, the discharge chute to the receiving hopper being shown at 72 in the drawing.

As thus far described, printing machine 40 is in many respects similar to that described and claimed in my aforementioned co-pending application, Ser. No. 465,612. Thus, the record card magazine 41, sensing station 45, selector mechanism 46, scanning station 48, and printing station 70 may be essentially similar in construction to the corresponding units described in that application. Accordingly, only a relatively brief description of these portions of printing machine 40 is afforded hereinafter. The punch-sensing mechanism 49 and information punch unit 71, on the other hand, represent an addition to the basic printing machine of application Ser. No. 465,612 and perform functions over and above those accomplished in the printing machine described in that application; moreover, the card transport generally indicated at 47 in Fig. 1 is substantially modified as compared with the earlier machine. Consequently, these portions of the printing machine 40 and the manner in which they co-operate with the remainder of the machine, along with certain features of the feeding arrangement for the web 500 of business forms 62, are described hereinafter in specific detail.

*Driving system*

The basic driving system for the printing machine of Figs. 1 and 2 is shown in schematic form in Fig. 5. It is to be understood that the driving arrangement illustrated in Fig. 5 is very substantially simplified as compared with the mechanical linkages and drives actually employed in the printing machine 40; nevertheless, the schematic driving system diagram does represent the basic mechanical and electrical operating system. Moreover, the driving system shown in Fig. 5 is in many respects essentially similar to that set forth in my aforementioned co-pending application, Ser. No. 465,612, although certain of the driving linkages and arrangements described in that application have been modified somewhat and additional drive mechanisms have been introduced to carry out the functions and operations characteristic of the present invention. Consequently, only a general description is given hereinafter for those portions of the driving system common to the present invention and the printing machine described in my application, Ser. No. 465,612, whereas further detailed information is provided with respect to those portions of the printing machine most closely related to the present inventive concept.

The basic driving system of the printing machine 40 comprises a motor 100 which is suitably coupled, as by a drive belt, chain, or other suitable drive coupling, to a main shaft 101. A main drive gear 102 is mounted upon the shaft 101 and engages suitable meshing gears upon a pair of shafts 105 and 106. Accordingly, shafts 105 and 106 are rotated continuously during operation of the machine.

Shaft 106 is coupled to a one-revolution operating shaft 104 by means of a clutch 103. Clutch 103, which preferably is of the solenoid-operated type, disengages periodically to couple shaft 106 in driving relation to shaft 104, the period of clutch disengagement being just sufficient to rotate the operating shaft 104 through one complete revolution each time the clutch is operated. Clutches of this general type are well known in the business machine art; preferably, the clutch is similar to that described and claimed in the co-pending application of Crink and Colyer, Ser. No. 342,896, filed March 17, 1953.

The one-revolution shaft 104 is one of the principal drive shafts of the printing machine, since it is this shaft which controls the cyclic or periodic feeding of master record cards into the sensing station 45 of the machine. The one-revolution shaft 104 is coupled to a rock shaft 109 as by means of an eccentric coupling 108 to afford a rocking motion of shaft 109 each time the shaft 104 makes a complete revolution. This rocking movement of shaft 109 imparts a reciprocating motion to a pair of card feed fingers 110 which are affixed to shaft 109 and which are utilized to feed the individual record cards 42 from the magazine 41 into the sensing station 45 of the printing machine. Shaft 104 is further coupled, as by suitable gear train or other transmission means, to a conveyor drive shaft 111 which comprises a part of a conveyor system for moving the record cards through the sensing station. In addition, shaft 104 is suitably coupled to a sensing station operating shaft 112, as will be explained more fully hereinafter in connection with Figs. 6 and 6A. Additional coupling means are provided to link the one-revolution shaft 104 to a cam shaft 121, this linkage being illustrated in Fig. 5 as comprising a gear belt 120.

The remainder of the operating elements of the printing machine drive on the right hand side thereof as illustrated in Fig. 5 are all driven from the continuously rotating shaft 105. Thus, shaft 105 is coupled in mechanical driving relationship to a further drive shaft 125, as by a suitable gear train. The operating shaft 125, in turn, is employed to drive the operating elements of a reject-card ejection mechanism 122, this coupling being afforded by some suitable means such as the timing belt or gear belt 126 shown in the schematic diagram. A further coupling means, such as the gear belt 176, is employed to link operating shaft 125 in mechanical driving relationship with another shaft 175 which in turn is mechanically coupled to a further shaft 179 by means of a one-cycle clutch 177. Clutch 177 is preferably of the solenoid-operated type and may be similar in construction to clutch 103. The cyclically driven shaft 179 is in turn coupled to a cam shaft 181 as by a suitable drive belt or chain 182; shaft 179 is also utilized to drive a spindle or sprocket member 180 which engages a web or strip of printing forms to pull the web cyclically through the punching station 71 of the machine as will be described more completely hereinafter.

The continuously driven shaft 105 is also suitably linked in mechanical driving relationship with a further shaft 151 which is in turn coupled to a shaft 152 by means of a one-cycle clutch 153. Clutch 153 is preferably of the solenoid-operated type and may be essentially similar in construction to clutches 103 and 177. Shaft 152 is drivingly coupled to a punch drive shaft 157 by suitable means which, as indicated in the drawing, may comprise a drive chain 155. A suitable cam 159 mounted upon shaft 157 and a cam follower 158 which engages the cam 159 is employed to actuate the vertically movable member 160 of the punching station 71 to effect the desired punching action in the printing machine as will be described more completely hereinafter.

An additional coupling arrangement, such as the illustrated drive chain 170, is employed to link shaft 105 with the operating elements of a portion of selector mechanism 46. Chain 170 engages a master driving gear 171 which, in turn, is effective to drive the various conveyor shafts and elements included within the selector mechanism and which will be described in greater detail hereinafter in connection with Fig. 6. The selector mechanism 46 further includes a pair of solenoids 123 and 124 which are employed to condition the selector in accordance with the information sensed from the master cards 42 in station 45 of the machine. The operation of this portion of the selector mechanism is also discussed hereinafter in connection with Fig. 6.

The initial drive shaft 101 of the printing machine is also coupled in mechanical driving relationship to a relatively short continuously-driven shaft 136. Shaft 136, in turn, is utilized to drive an operating shaft 134, being linked thereto by means of a solenoid-operated clutch 135. A master drive chain 137 is driven from the shaft 134 and is utilized to actuate the conveyor mechanisms and other operating devices included in the scanning station 48 and in the punch-sensing station 49 of the printing machine (see Fig. 1), except for the actual scanning devices of the machine station 48. Thus, a pair of gear-type belts 138 and 139 or other suitable driving means are linked to two shafts 140 and 141 respectively, shafts 140 and 141 being driven by the master chain 137. Gear belts 138 and 139 are utilized in driving the individual "print" order record instruments 42 through the scanning station and into the punch-sensing station 49. Similarly, a gear-type belt 142 or other suitable coupling device, which is driven from another shaft 143 coupled to the master chain 137, is employed to drive the transport mechanism which conveys the cards through the punch-sensing station 49 and ejects them from the punch-sensing station after completion of the sensing operation therein. A further pair of belts or other similar devices 144 and 145 are utilized to control and drive the "skip" or "non-print" cards through the machine as will be described in detail hereinafter. Another linkage device, such as the drive belt 146, which is driven from a shaft 148 coupled to belt 142, actuates a positive-ejection device for the non-print cards. The main drive chain 137 also engages a sprocket upon a cam shaft 147. The cams mounted upon shaft 147 are employed to actuate the data-analyzing mechanism included in sensing station 49 of the printing machine and, in part, to control movement of the master record cards through the punch-sensing station.

The operating shaft 134 is also utilized to actuate a part of the selector mechanism 46. Thus, a cam 160 mounted upon shaft 134 is engaged by a cam follower 161, the cam follower 161 being linked to the shuttle 164 of selector mechanism 46 as by a pair of links 162 and 163. The operating shaft 134 is also coupled, as by a suitable gear train or other mechanical driving linkage, to a shaft 165 upon which a sprocket 166 is mounted. The sprocket 166 comprises a part of the feeding mechanism utilized to feed business forms or other instruments through the printing station 70 of the printing machine (see Fig. 2).

*The sensing and selecting stations*

Figure 6A:
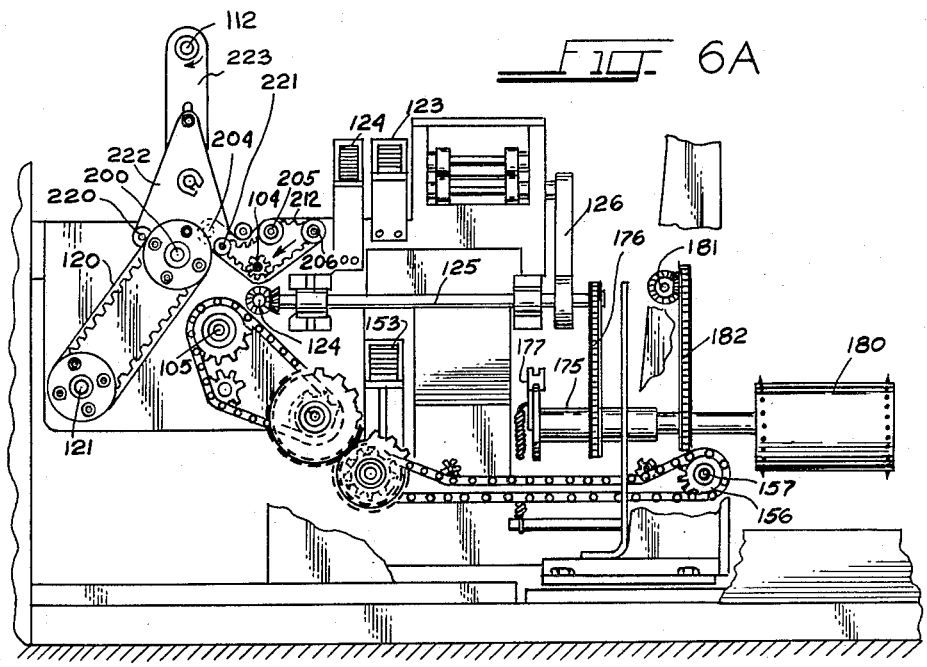
Fig. 6A is a side view, partly schematic, with the covers and parts of the housing cut away to show the selector and punch drives.

Fig. 6 and 6A illustrate in substantial detail the sensing and selecting mechanism of the printing machine illustrated in Figs. 1 and 2; Fig. 6 affords a sectional view taken longitudinally through the sensing station 45 and the selector mechanism 46, whereas Fig. 6A is an elevation view of the same part of the printing machine and further includes a part of the driving mechanism for the punch unit of the machine. As indicated in Fig. 6, the cyclically-driven shaft 104 is utilized to drive an auxiliary shaft 200, the operating connection between the two shafts comprising a pair of meshing gears 201 and 202 supported upon shafts 104 and 200 respectively. As indicated hereinbefore, the eccentric coupling mechanism 108 is utilized to actuate rock shaft 109 and thereby periodically reciprocate the feed fingers 110 to feed the master record instruments one-by-one from rack 41 into the sensing station 45. After the initial movement of the cards, imparted thereto by the action of feed fingers 110, continued feeding of each card into the sensing station is afforded by a conveyor mechanism including a plurality of conveyor shafts 203, 204, 205 and 206, all of which are located below the card slot 207 of the sensing station and a further series of conveyor shafts 208, 209, 210, and 211 positioned above the card level 207. As indicated in Fig. 6, each of shafts 204, 205 and 206 is cyclically driven from the one-revolution shaft 104 by means of a gear belt or timing belt 212 which engages suitable gear-type pulleys mounted upon each of the three conveyor shafts and upon the operating shaft 104. Shaft 203, on the other hand, is gear-connected to shaft 204 for rotation therewith; the driving connection between these two shafts has been omitted from the drawings in order to avoid undue complication therein. Preferably, shaft 208 is also constructed as a driven part of the conveyor arrangement for feeding the cards into the sensing station 45 and may be driven from shaft 203 by means of a suitable gear connection or other mechanical driving linkage (not shown). Shafts 209—211, on the other hand, may be conveniently constructed as freely-rotatable shafts or may be employed to support freely-rotatable roller elements or the like and do not necessarily require any direct driving connection other than that afforded by the contact of a record card therewith as the card moves into the sensing station.

A cam 214 supported upon the cyclically-driven shaft 200 is engaged by a cam follower 215 mounted at one end of a cam lever 216; a stop elements 217 is connected to the opposite end of the lever 216. Cam follower 215 is maintained in contact with cam 214 by suitable means such as a biasing spring 218 connected between cam lever 216 and the frame of the machine. Stop element 217 is utilized to interrupt the forward motion of the master record card through sensing station 45, in the course of each sensing cycle, for a time interval sufficient to permit sensing of the identification data carried by the card in the form of punched holes 44 (see Fig. 3). It is during this sensing interval that the machine determines whether a particular record instrument present in the sensing station is of the "print," "skip," or "reject" order.

Shaft 200 is also utilized to operate the basic sensing mechanism of sensing station 45. For this purpose, a conjugate cam is mounted upon this shaft and is engaged between two cam follower 220 and 221 of a composite cam lever 222. Cam lever 222 is connected by a link 223 to the rock shaft 112 utilized to actuate the sensing mechanism. A pair of links 224 and 225 are affixed to shaft 112 for rotation therewith; each of these links engages a shaft 226, as indicated in Fig. 6. Shaft 226, as best shown in Fig. 7, is supported between a pair of sensing mechanism support members 227 and 228 which are utilized to support the individual sensing pins 229 of the sensing mechanism. Support members 227 and 228 are supported for vertical sliding movement with respect to a pair of frame members 229 and 230 respectively, the vertical movement of the support members with respect to the frame members being guided and controlled as by a pair of guide elements 231 and 232 affixed to support members 227 and 228 respectively and engaged in slots in the frame members 229 and 230 respectively.

The pin box comprising sensing pins 229 is affixed to a further support member 234 extending between support members 227 and 228 as indicated in Fig. 6. The construction of the pin box may be of conventional form and may be essentially similar to that described and illustrated in my aforementioned co-pending application Ser. No. 465,612. Thus, as indicated in the detailed views of Figs. 8 and 9, the individual sensing pins 229 each include a card-engaging section 236 separated from an upper section 237 by resilient means such as a spring 238. The card-engaging sections of the pins are of given dimensions such that they will fit through one of the openings 44 in a master card 42 (see Fig. 3) and the pins are distributed and arranged in the sensing head in a pattern corresponding to the different positions in which the punched holes 44 may be located on the master card. As shown in Fig. 9, each of the card-contacting pin sections 236 is aligned above a contact pin 239 supported below the card level 207 in the sensing station. Consequently, whenever any of the pins 236 is moved downwardly and extends through one of the holes in the master record card, it engages one of the contact pins 239 and closes an electrical circuit in the machine. The electrical circuits actuated by contact pins 239 may be programmed to determine which record cards should be utilized in printing business forms, which record instruments should be retained in the card file although not utilized in a given printing operation, and which should be removed completely from the file; thus, the electrical circuits actuated by pins 239 determine whether a given record instrument is of the "print," "skip," or "reject" order. Because electrical circuit arrangements suitable for this purpose are clearly and extensively described in the aforementioned co-pending application Ser. No. 465,612, and because machines incorporating circuit arrangements of this type are commercially available, the sensing and selector-actuating circuits for the printing machine will not be described or illustrated herein.

Segregation of the record cards into the three different orders or categories is accomplished in the selector mechanism 46. This mechanism, shown in Fig. 6, includes three different ramps 240, 241 and 242 which comprise the "print," "skip," and "reject" ramps respectively. A plurality of feed rollers 244, 245, and 246 are associated with ramps 240, 241, and 242 respectively to convey the master cards to three different levels or trays 248, 249, and 250 respectively in the shuttle collector 164 (see Fig. 5). The shuttle 164 is also provided with a lid 251.

A retainer bar 252 extends transversely of the entrance portion of selector mechanism 46; retainer bar 252, which is maintained in fixed position during operation of the machine, comprises a part of the selector arrangement. A wedge-shaped guide member 253 is mounted within the selector mechanism below retainer bar 252; guide member 253 is supported for pivotal movement and, when pivoted in a clockwise direction, engages in a slot 254 in the lower surface of retainer bar 252. A similar guide member 255 is mounted within the selector mechanism at a point immediately following the guide member 253 and is supported for pivotal movement in a counter-clockwise direction into engagement with the upper surface 256 of ramp 240. Guide member 253 is mechanically linked to the "skip" solenoid 124 of the printing machine, whereas guide member 255 is similarly linked to the "reject" solenoid 123 (see Figs. 5 and 6A).

When the printing machine is placed in operation, shaft 104 is rotated in cyclical manner as indicated hereinabove and thereby drives the card-feeding mechanism periodically to impel one of the record cards 42 from its position in rack 41 into the sensing station 45. As the card advances, the stop gate 217 is maintained in the raised or stop position shown in Fig. 6 by means of the mechanical linkage comprising cam lever 216, cam follower 215, and the cam 214. Thus, the record instrument advances into the sensing station 45 until its movement is arrested by the gate 217, which stops the card in a position in which it is properly aligned with respect to the sensing pins 229. Taking the time of arrival of the master record card in this sensing position as a starting point, the time relationship of operation of the elements of the sensing and selector mechanisms is shown in the timing chart of Fig. 24. As indicated therein, when the card reaches the sensing position the operating linkage comprising cam followers 220 and 221, cam lever 222, and linkage 223 is actuated to rotate shaft 112 in a clockwise direction, impelling the shaft 226 downwardly and thereby moving the entire sensing head including pins 229 toward the master record card. This initial downward movement of the sensing head occurs in approximately the first 15° of rotation of the cyclically driven shaft 200, the pins reaching card level after about 10° of rotation of that shaft. The sensing pins close individual contacts actuated by contact pins 239 to establish circuit conditions indicative of the punched card information carried by the master record card. As indicated in Fig. 24, one of the cams supported upon cam shaft 121, which is driven from shaft 200 by the belt drive 120, conditions the sensing circuits for operation during the time in which the pins are completely down.

Assuming that the first master card is one which is of the "reject" order, that is, a card which is to be removed from the master record file, the electrical selector circuits of the printing machine operate to energize the "reject" solenoid 123. Energization of this solenoid pivots guide member 255 in a counterclockwise direction into engagement with the upper surface of ramp 240. Subsequently, continued rotation of the one-revolution shaft 194 actuates the sensing mechanism to lift the sensing head, bringing the pins above the card level after approximately 90° of rotation of the one-revolution shaft. Thereafter, continued rotation of shaft 200 causes the cam linkage connecting that shaft with stop gate 217 to be actuated to lower the stop gate and permit continued travel of the record card. As the record instrument enters selector mechanism 46 it passes over guide member 253 but is deflected upwardly onto ramp 242 by guide member 255. The conveyor rollers 246 engage the card and impel it outwardly into the reject level 250 of the shuttle 164.

After the card has been cleared completely from the sensing and selecting station the next record card is forwarded into the sensing station. The sensing operations as described above are repeated and, assuming that the card is one which is not intended to enter into the printing operation but which is to be retained in the master record file, the "skip" solenoid 124 is energized. Energization of the skip solenoid causes guide member 253 to rotate in a clockwise direction into slot 254 of retainer bar 252, thereby closing off both the print and reject ramps of the selector mechanism. Consequently, when the card is subsequently released and conveyed into the selector mechanism, this record card is guided down ramp 241 and into the skip level 249 of the shuttle, being impelled in that direction by conveyor rollers 245.

The third master record card may be of the "print" order; that is, it may represent a card from which information is to be printed upon a business form in the course of the printing operation in which the machine is engaged. When this is the case, neither of the two solenoids 123 and 124 is energized. Consequently, when the print order card is released for movement into the selector mechanism it proceeds directly over guide member 253 and under guide member 255 along ramp 240 to the shuttle level 248, being impelled toward the shuttle by the conveyor rollers 244.

The sensing of a "print" order card in sensing station 45 does, however, cause the machine to energize the solenoid-operated one-revolution clutch 135 (see Fig. 5). Moreover, this is the only condition which energizes this clutch during normal operation of the machine. Consequently, and as indicated in Fig. 24, the shuttle feed cam 160 is driven through a full revolution during the course of a sensing cycle in which a print card is identified by the machine. Rotation of the shuttle feed cam 160 actuates the linkage comprising cam follower 161 and members 162 and 163 to impel the shuttle through a short distance in the direction indicated in Fig. 5 by arrow 260. This movement brings the shuttle to a position closely adjacent to individual card transport mechanisms to be described hereinafter and permits those devices to remove the print and skip order cards from levels 248 and 249 respectively of the shuttle collector as described more completely hereinafter in connection with Figs. 10–12. Subsequently, and before the next record card is forwarded from the sensing station into the collector, the shuttle travels in the reverse direction beyond its initial or normal position and brings the tray or level 250 of the shuttle to a position immediately adjacent the ejection mechanism 122. This permits the continuously-driven ejection mechanism to remove any reject cards present in shuttle level 250, thereby separating them completely from the master record file. Thereafter, the shuttle returns to its normal position ready to receive the next card or cards. It is thus seen that the shuttle is actuated each time a print order card is sensed and thus feeds the print cards one-by-one into the print card transport of the printing machine. Skip and reject cards, on the other hand, are permitted to accumulate in the shuttle until a print order instrument is sensed, thereby avoiding intermittent operation of the machine in response to sensing of cards of these two categories.

*The scanning station*

The basic mechanical operating elements of the scanning station of printing machine 40 are shown in detail in Figs. 10–12, which also show a portion of the skip-card transport of the machine. As noted above, after each cycle of the machine in which a record card of the print order is deposited in selector mechanism 46, the collector shuttle 164 is actuated to feed the print card into the scanning station and simultaneously to feed any skip cards present in the shuttle to a separate skip card transport located immediately beneath the print card transport. The print card transport, as shown in Figs. 10 and 11, comprises an operating shaft 300 which is driven by the timing belt 138 as described hereinabove in connection with Fig. 5. A pair of rollers 301, only one of which appears in the drawings, are mounted upon shaft 300 at opposite sides of the path or travelway 303 through which the cards are to be advanced; these rollers are utilized to drive a pair of relatively narrow conveyor belts 305 and 306. The spacing between belts 305 and 306 is made large enough to permit the belts to engage the edges of the master record cards 42 without obscuring the printed matter on the cards or interfering with the scanning station as it analyzes the image data 43 (see Fig. 3). As the cards pass through this section of the machine, they are engaged by a series of pairs of rollers 307, 308, and 309 which are spring-biased toward the cards and toward the corresponding conveyor rollers 301, 310, and 312 to prevent buckling or other jamming action in the scanning station portion of the print order transport. Rollers 309 are mounted directly above the rollers 312, which are mounted upon a shaft 313 and are driven by conveyor belts 305, 306. Shaft 313 is also utilized to support and to drive a pair of starting or initiating conveyor belts 315 and 316 which co-operate with belts 305 and 306 to feed the individual record cards from the shuttle level 248 into the image-analyzing station 43 of the machine.

The skip card transport, which is best shown in Figs. 11 and 12, comprises a constant-speed conveyor system including a lower conveyor belt 320 and an upper belt 321. One end of belt 320 engages a pulley 322 mounted upon a shaft 323, the shaft 323 being driven by belt 144 as indicated above in connection with Fig. 5. Belt 321, on the other hand, is not directly driven, but moves concurrently with belt 320 by virtue of contact with belt 320 or with the skip cards moving through the transport.

The scanning operation, as performed in printing machine 40, is essentially similar to that described in the aforesaid Tompson patents and in my aforementioned co-pending application Ser. No. 465,612. Light from suitable sources is directed through a pair of apertures 330 and 331 in the base of print card transport 303 to impinge upon a pair of photocells (not shown) having individual lens systems as generally indicated at 332 and 333 in Fig. 11. The light transmitted through the record cards from apertures 330 and 331 reaches the photocells only after transmission through a pair of helically-slotted image analysis members (not illustrated) which are driven at a constant speed from a motor 335, shown in Fig. 1, the motor also being utilized to drive the printing anvil members in printing station 70 (Fig. 2) as will be set forth in greater detail hereinafter. It should be understood that any other suitable facsimile analyzing and reproducing arrangement or other high speed reproduction system may be substituted for the scanning and printing stations of the machine without in any sense departing from the inventive concept, since the invention is not predicated upon use of any particular scanning and reproduction system or systems.

The master record cards of the print order, after having been scanned in station 48, continue their movement through the scanning station and pass between a pair of alignment or guide plates 340 and 341. Thereafter, continued movement of the "print" cards advances them to the punch-sensing station 49, whereas the "skip" cards are advanced between a pair of guide plates 342 and 343 to another portion of the skip card transport.

*The punch-sensing station*

The punch-sensing station 49 of the printing machine is shown in substantial detail in Figs. 13–17. In this portion of the printing machine, the punched holes in the individual master record cards from which information has been printed upon the business forms are again sensed as a preliminary to punching the duplicate identification data 66 in the forms (see Figs. 3, 4). As each record instrument of the print order is transported from the scanning station of the machine, it is engaged by a second conveyor comprising a pair of rollers 350 and 351 supported upon a common rotatable shaft 352 at one end of which a spur gear 353 is mounted. Spur gear 353 is driven through a gear train comprising the gears 354, 355 and 356, the latter gear member being mounted for rotation upon the shaft 357 which also supports a pulley 358 engaged by the gear belt 139. The overall gear ratio for the gear train 353—356 is made to afford a definite speed reduction for the cards as they are impelled toward the punch-sensing station 49 by conveyor rollers 350 and 351. As indicated hereinabove, the master record cards are preferably overlapped with respect to each other to a slight extent as they are fed through the scanning station of the printing machine. The deceleration afforded by the reduced-speed conveyor arrangement comprising rollers 350 and 351 causes the cards progressively to overlap each other to a greater and greater extent. The slowing-down action afforded by this portion of the print card transport is extremely important in operation of the machine, since in effect it constitutes a time delay mechanism and substantially reduces the length of the card transport which would otherwise be necessary in this portion of the machine.

The print order cards continue their movement toward the punch-sensing station 49 between a pair of guide plates 360 and 361. As the cards emerge from between these two guide plates, they enter the space between a further pair of guide plates 362 and 363 which comprise a part of the sensing station structure. Movement of the cards within the sensing station itself is controlled by a third conveyor arrangement comprising a plurality of driven rollers 364 supported above but extending through guide plate 362 and a mating set of drive rollers 365 supported below guide plate 363 but extending through apertures in the guide plate into engagement with the driven rollers 364. Each of rollers 365 is driven from the gear belt 142 and the drive ratio for this gear belt drive is made such that the conveyor 364—365 moves the print order cards at a very much higher speed than that with which they enter punch-sensing station 49. Thus, as each print order card engages the first of the conveyor roller pairs 364, 365, the card is accelerated rapidly and conveyed at a relatively high speed into the punch-sensing station until its movement is arrested by engagement with a stop member 366.

Figure 16:
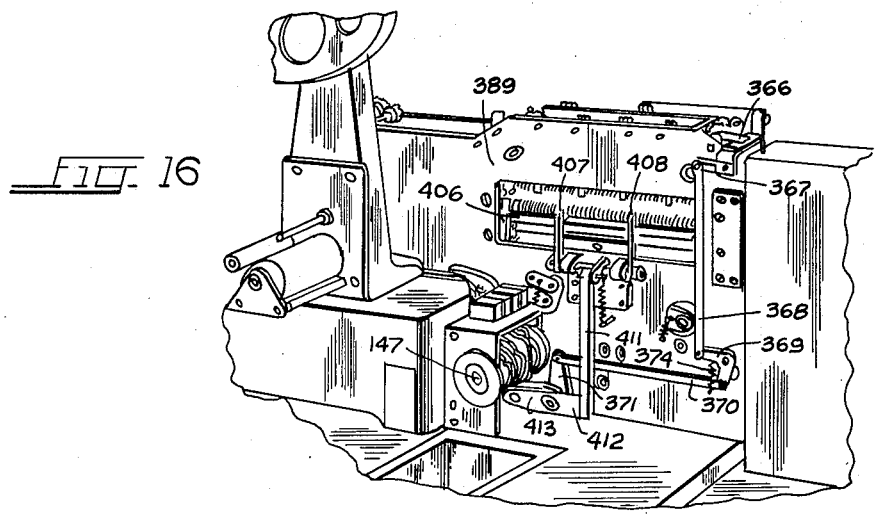
Fig. 16 is a perspective view of the punch-sensing mechanism shown in Fig. 14, taken from the opposite side of the printing machine.

Stop member 366 is pivotally supported upon the frame of the printing machine and includes a connecting arm 367 pivotally connected to a link or tie rod 368 which, as illustrated in Fig. 16, extends vertically along the side of the printing machine. The other end of link 368 is pivotally connected to one arm of a bell crank 369, the other arm of the bell crank being connected to a horizontally extending link 370. The opposite end of link 370, in turn, is pivotally connected to a cam follower bell crank 371 journalled upon a shaft 372 and having a cam follower which engages a stop-actuating cam 373 mounted upon the cam shaft 147. A spring 374 connected to bell crank 369 biases the stop member linkage toward its normal or "down" position.

Cam shaft 147 also supports a pin-restoration cam 375 and a conjugate sensing station actuating cam 376, 377, all of these cams being pinned or otherwise affixed to shaft 147 for rotation therewith. A pair of cam followers 378 and 379 engage cams 376 and 377 respectively, the two cam followers being mounted upon the two arms 380 and 381 respectively of a composite cam lever 382. Cam lever 382 is rotatably supported upon the shaft 372 and includes a pair of extensions 384 and 385 located closely adjacent the opposite sides of the printing machine. Cam lever extension 384 is pivotally connected to a connecting link 386; link 386 is restricted to linear vertical movement by means of a guide pin 387 which extends outwardly from the link and engages in a slot 388 in a side frame member 389 of the machine. Similarly, cam lever extension 385 is pivotally connected to a link 390 which is guided for vertical movement by a guide pin 391; pin 391 engages in a slot 392 in the machine frame member 393. Guide pin 387 is also utilized to connect link 386 to a vertical ram member 394, whereas pin 391 connects link 390 to a second similar ram member 395. The two ram members, at their upper extremities, are secured to a ram plate 396 which comprises a part of a sensing pin box 397.

Figure 15:
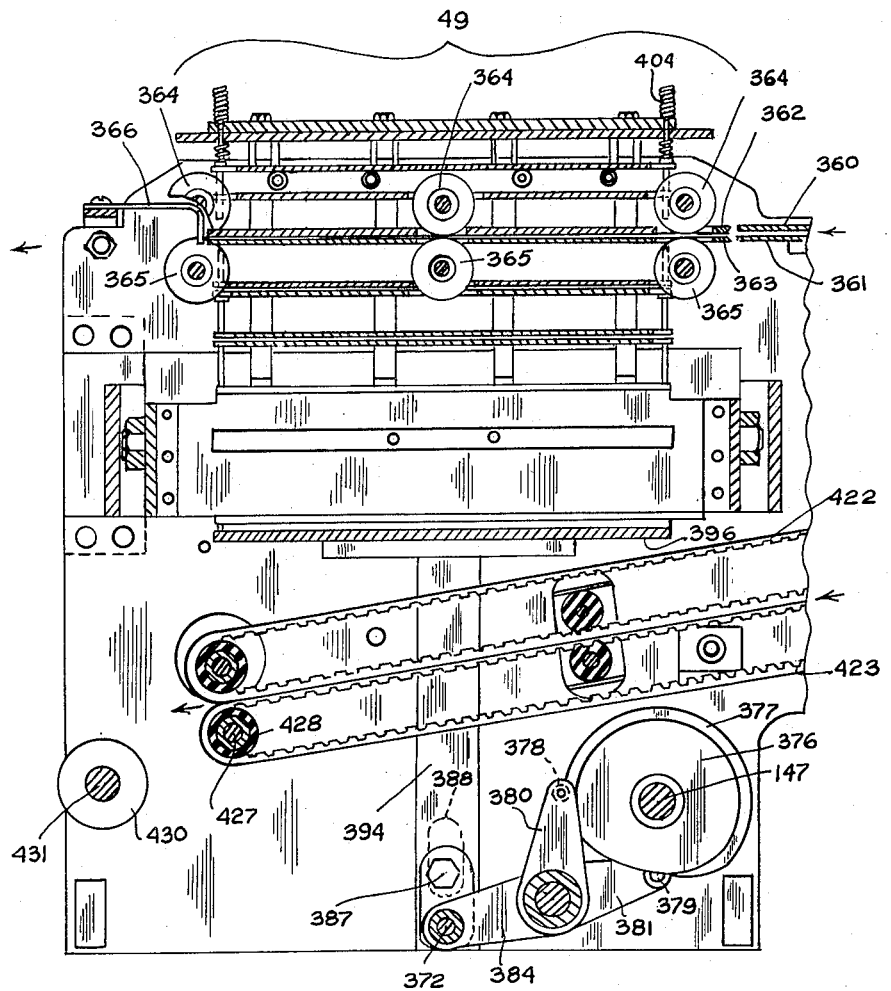
Fig. 15 is a sectional view of the punch-sensing apparatus of the machine.
Figure 17:
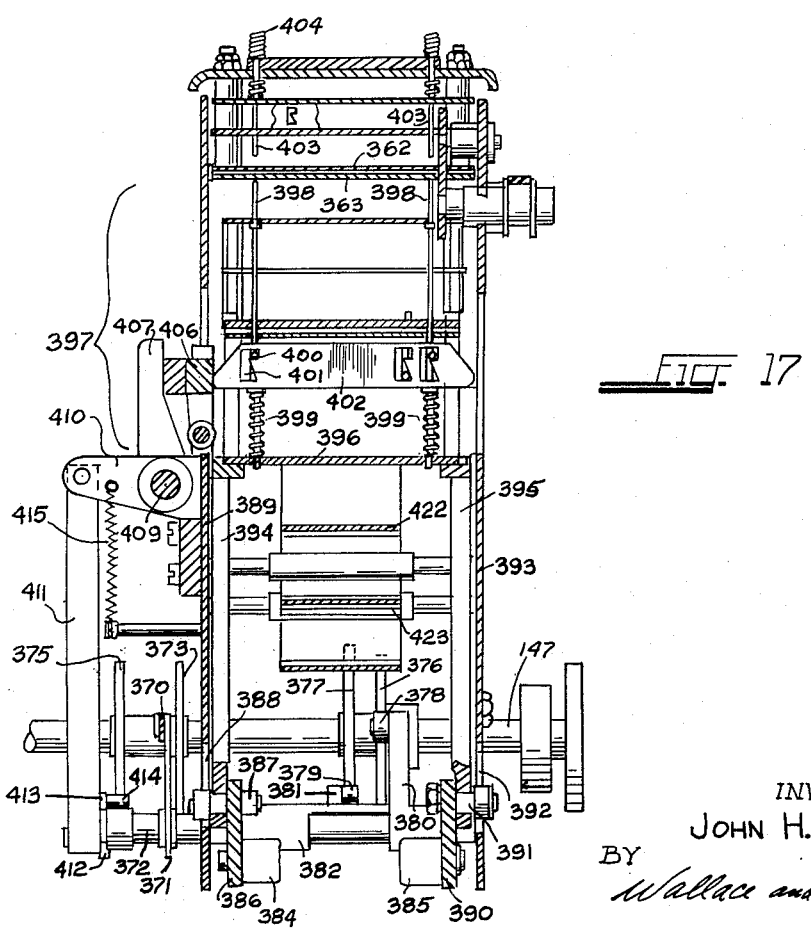
Fig. 17 is a sectional view of the punch-sensing mechanism taken along line 17—17 in Fig. 14.

The pin box 397 may be of completely conventional construction; for example, the sensing pin arrangement described hereinabove in connection with the initial sensing station 45 of the printing machine could be employed for this portion of the machine as well. On the other hand, any other of several sensing pin arrangements well known in the art may be employed for this portion of the machine. The particular sensing pin mounting arrangement illustrated in Figs. 15 and 17 is commonly employed in tabulating machines and in other commercial devices and includes a multiplicity of sensing pins 398 and a corresponding series of biasing springs 399. The biasing springs oppose vertical downward movement of the sensing pins 398 relative to the frame of the pin box, which includes ram plate 396 and the usual frame and guide members for supporting and aligning the sensing pins. Each of the sensing pins 398 is provided with a detent pin 400 which engages in an opening 401 of one of a series of detent plates 402. Moreover, each of the pins 398 is also aligned with a mating or contact pin 403 which engages one end of a Bowden wire cable 404, the contact pins and the ends of the Bowden cables being supported in a fixed frame immediately above the guide members 362 and 363 between which each print order card passes in the course of the punch-sensing operation.

Each of detent plates 402 is engaged at one end by a detent-restoration bar 406 which is pivotally supported upon frame member 389, as indicated in Fig. 16, and which is engaged by a pair of cable-restoration levers 407 and 408 pivotally supported upon a shaft 409 as best shown in Figs. 16 and 17. Levers 407 and 408 constitute two similar arms of a bell crank structure, the other arm 410 of the bell crank being connected by a link 411 to one end of a cam lever 412 which is pivotally mounted upon shaft 372. The opposite end 413 of lever 412 supports a cam follower 414 which engages the pin restoration cam 375. A spring 415 connected to bell crank arm 410 biases the pin-restoration linkage toward its normal or unactuated position as shown in Fig. 17.

As indicated hereinabove, when a record card of the print order engages the first pair of rollers 364, 365 in the sensing station 49, it is impelled into the sensing station at a relatively high rate of speed and is cleared completely from overlapping engagement with the next subsequent print order card. Movement of the card is illustrated in the timing chart of Fig. 23 as a function of rotation of the punch-sensing cam shaft 147. As indicated therein, movement of the card into the identification data analyzing station 49 requires approximately 135° of rotation of the cam shaft or a time of approximately 0.575 second. As the card advances into sensing station 49, the rotation of cam shaft 147 and the consequent rotation of stop finger cam 373 rotates cam lever 371 in a counterclockwise direction as seen in Fig. 16. Consequently, the linkage connecting lever 371 to the stop finger 366 causes the stop finger to pivot into a position in which it blocks the space between guide members 362 and 363 at the exit end of the machine and effectively halts forward movement of the card when the card reaches the sensing position. As indicated in Fig. 23, the stop finger is down for an interval corresponding to the rotational interval of approximately 90° to 285° for cam shaft 147.

With the stop finger down and with a print order record instrument positioned in the sensing station in alignment with the pins 398 thereof, continued rotation of cams 376 and 377 on shaft 147 actuates the linkage between those cams and the ram plate 396 to impel the ram plate and the remainder of pin box 397 upwardly within the sensing station. This action is initiated, as indicated in Fig. 23, after approximately 165° of rotation of the cam shaft 147. Those pins which encounter no opening in the record card are prevented from moving upwardly once they have contacted the card; the framework of the pin box moves upwardly relative to the arrested pins against the bias afforded by the springs 399. Those pins 398 which are aligned with the information apertures 44 in the master record card, however, continue their upward movement unimpeded and engage the contact pins 403 corresponding thereto. Upward movement of the contact pins, in turn, is transmitted through the corresponding Bowden cables 404 to a series of individual punch elements included in the punching station 71 of the printing machine; the Bowden cables extend from punch-sensing station 49 through a conduit 420 to the punching station of the machine. Consequently, the sensing pins 398 which are aligned with the identification data punching in the record card in effect establish a direct mechanical connection, through the Bowden cables, to the punching station and control operation of the punch unit as will be described more fully hereinafter. As indicated in Fig. 23, the pin box 397 is maintained in its raised or actuated position for only a relatively short interval and is lowered again before stop finger 366 is raised to permit ejection of the card from the punch-sensing station.

The individual pins 398 are retained in their actuated position by the engagement of detent pins 400 in the detent slots 401 of plates 402. On the next cycle of the machine, however, and prior to the next sensing operation, rotation of the cam 375 on shaft 147 actuates the linkage between that cam and detent bar 406 and impels the detent bar inwardly to release the detenting arrangement and restore the pins 398 to their original position relative to the frame members of the pin box 397. This action is also indicated in time relation to the other operations of the punch-sensing station in Fig. 23.

As indicated hereinabove, the skip order cards are to be retained in the master record file along with those of the print order. Consequently, as the print order cards proceed through the sensing station 49, the skip order cards also continue their movement through this portion of the machine, the skip transport comprising a further pair of belt-type conveyors 422 and 423. This conveyor arrangement is actuated by the drive belt 145 which engages a pulley 426 supported on the same shaft 427 with one of the conveyor rollers 428. In addition, as the skip cards emerge from the conveyor 422, 423, they contact an ejection roller 430 mounted upon a shaft 431 and actuated by means of the drive belt 146. Roller 430 accelerates the final movement of the skip cards and thereby assures disposition of the skip cards in the record-receiving container 51 (Fig. 1) before the corresponding print card reaches that file.

The important timing relationship incorporated in the print card transport and the subsidiary but related timing relationship for operation of the skip card transport in the printing machine may best be understood by reference to Fig. 18, which shows individual cards at various positions as they traverse the two transport conveyor systems. As indicated in that figure, after a given print order card leaves the shuttle position 450, somewhat more than one-half cycle of the one-revolution shaft 134 brings the card to the scanning station as indicated by card position 451. For the machine under consideration, in which the speed of shaft 134 is established at 39.1 R. P. M., this time is approximately 0.9 second; it will be understood, however, that the actual times shown in Fig. 18 are subject to variation and are determined primarily by the speed at which the machine is intended to operate, the physical dimensions of the record instruments, and other similar factors. For the purpose of the time comparison made herein, it is assumed that the time required for each cycle of the print and skip order transport systems is 1.54 seconds.

The master record card traverses the scanning station, as indicated in Fig. 18, reaching the position 452 approximately one cycle or 1.54 seconds after it first enters the scanning area as indicated by position 451. The speed through the scanning station is constant, being controlled by the first print order conveyor including rollers 313 and 322 and the conveyor belts associated therewith. During the next cycle of the machine, however, movement of the print order card is controlled by the second or reduced-speed conveyor comprising rollers 350 and 351; consequently, in the next full cycle of the machine, the card is advanced only to the position 453. Two additional operational cycles are required to transport the record instrument to the position 455 immediately preceding admission of the card into the punch-sensing station of the machine, the intermediate cyclic position being indicated at 454.

In the next succeeding cycle of the machine, movement of the print order card is controlled by the third conveyor, which is incorporated in the punch-sensing station and which is represented in Fig. 18 by conveyor rollers 365. It will be recalled that this third conveyor operates at a very much higher speed than the second conveyor comprising rollers 350, 351. Accordingly, the card is advanced very rapidly during the first portion of the next succeeding machine cycle, reaching the sensing position shown in phantom outline at 457 after one third of the cycle. In this position, the card engages stop member 366 and is held in position 457 for a period of time sufficient to carry out the requisite sensing operation. This dwell period may, for example be of the order of 0.64 second as indicated in Figs. 18 and 23. Thereafter, and during the same machine cycle, the print order card is ejected from the transport system as indicated by card position 456.

The skip card transport, on the other hand, impels the skip cards through the machine at a constant rate of speed. This is indicated in Fig. 18 by the various card positions 460, 461, 462, 463, 464, 465 and 466 which correspond in time to print card positions 451, 452, 453, 454, 455, and 456 respectively. It will thus be seen that a skip card which enters the transport arrangement simultaneously with a given print card reaches the end of the transport system at the same time as the print card and is discharged into the record instrument receptacle 51 before the corresponding print card, due to the location of the skip card transport below the print card transport and to the action of ejection roller 430. Accordingly, the print and skip order cards are reassembled by the machine in their original order and may be returned to the original file for further use without the necessity of reorganizing the file.

The time delay introduced by the low-speed conveyor comprising rollers 350 and 351 is a highly important feature of the machine operation. This feature of the invention makes possible very substantial economies in the machine construction, since it effectively eliminates any necessity for time delay devices in the mechanism connecting the punch-sensing station and the punching unit of the machine. At the same time, the time delay mechanism comprising the reduced-speed rollers 350 and 351 precludes any requirement for undue lengthening of the machine to achieve the desired time relationship between the print order cards and the forms being printed and punched. Thus, the extremely simple and inexpensive time delay mechanism of the print card transport, in combination with the two high-speed conveyors, comprises a highly important feature of the invention.

The printing station

The printing station, along with the various web-feeding and other mechanisms associated therewith, is best shown in Figs. 2, 19 and 20. As indicated in these figures, the web 500 of business forms is fed from a supply magazine or roll (not shown) through the opening 53 in the base of the machine over a series of rollers 501, 502, 503, 504 and 505 into the printing station 70. Movement of the web within the printing station is guided by a series of guide elements 506, 507 and 508, the web being brought into contact with the opposite sides of a rotating printing anvil 509 driven by the motor 335 (Fig. 1). After it leaves the printing station, the print-receiving web 500 contacts a further guide roller 510 and engages the first feed sprocket 166 which, as indicated in Fig. 5, is driven from the one-revolution shaft 134. As the web leaves the sprocket 166, it is guided into a time-delay mechanism comprising a first guide roller 511, a loop-limiting enclosure 512, and outlet guide rollers 513 and 514, after which the form is fed into the punch unit 71 of the printing machine.

A carbon strip 520 is fed from a supply reel 521 located immediately above the business form guide roller 502 over a pair of guide rollers 522 and 523 into the printing station 70. Within the printing station, the carbon strip is guided by members 506 and 507 and a further guide roller 524 into contact with the business form web 500 at the opposite sides of the rotating printing anvil 509. As the carbon strip 520 leaves the printing station, it is guided by a series of suitable guide rollers to a takeup reel 525.

Insofar as the printing station itself is concerned, the construction and operation of the printing machine of the present invention is essentially similar to that described in my aforementioned co-pending application. Thus, the business form web 500 and the carbon web 520 are brought into contact with each other adjacent opposite sides of the rotating printing anvil 509, which includes a series of helical print bars which are rotated in synchronism with the scanning apparatus of the printing machine. A pair of vibrator units 527 and 528 are employed to bring the two webs in contact with the printing anvil under the control of the facsimile signal developed by the scanning station to transfer carbon from the carbon strip to the print form and reproduce the desired printed or other image material. Because this type of printer is currently in widespread commercial use, and is clearly and completely described in my aforementioned co-pending application as well as in the above-noted Tompson patents, no further description of the printing station or of its operation is deemed necessary or desirable herein.

The time delay or sequencing arrangement comprising sprocket 166 and the feed roller and enclosure arrangement 511, 513, however, represents a distinctive portion of the present printing machine as compared with the machine described in my prior co-pending application. As indicated hereinabove, the business forms 63 included in print-receiving web 500 are to be punched with the same identification data as that carried by the record instruments from which they are printed. It is not practical to attempt to punch this information on a continuously moving paper web, since the inaccuracies almost inevitably introduced by punching the web in this manner would make it extremely difficult if not impossible to interpret the punched-hole information at a later time. Consequently, the time-delay arrangement for the business form web 500 is provided in order to permit interruption in movement of a part of the business form web without requiring any interruption in its movement through the printing station 70.

Thus, during a punching operation, the print-receiving web 500 is maintained stationary, insofar as longitudinal movement is concerned, in the punch unit 71. During this interval, the loop 530 in web 500 builds up, the maximum loop size being approximately that indicated in Fig. 20. Subsequently, after the punching operation, the business form web 500 is moved through the punch unit at a speed substantially greater than that at which it is fed into the loop enclosure 512. During this time, the loop 530 may be reduced very substantially as to the size indicated in Fig. 20 by the phantom-line loop 530A. Accordingly the time delay or sequencing mechanism afforded by sprocket 166 and the members 511—513 makes it possible to afford continuous movement of the business form web through the printing station and intermittent or cyclic movement of the same web through the punch unit of the printing machine. In this connection, it should be understood that sprocket 166 controls the longitudinal movement of the web through the machine stations preceding that sprocket whereas movement of the web thereafter is controlled entirely by the second drive sprocket 180 (see Figs. 5 and 20).

The punching station

The punching station 71 of the printing machine is best shown in Figs. 20–22, 25 and 26. The punching station includes a pair of spaced fixed frame members 540 and 541 and a fixed upper guide plate 542 which extends across and is supported by the two frame members. The upper guide plate 542 includes a series of apertures into which the ends of the Bowden cables from punch sensing units 49 are fitted as shown in detail in Fig. 22. As indicated therein, the end 544 of each cable wire engages an enlarged head portion 545 upon an actuating rod or pin 546 which extends through an aperture in a guide plate 547 and into contact with the upper extremity of a punch set-bar 548. The individual set-bars 548, which correspond in number and alignment to the sensing pins of the punch-sensing station 49, are included in a punch unit pin box 550. The pin box 550 is of standard commercial construction and includes a series of detent plates 551 which engage individual detent pins 552 on the set-bars. The set-bars are spring loaded as indicated at 553 in Fig. 21 to permit punch restoration as will be described hereinafter. The pin box 550 is mounted in fixed position within the space defined by frame members 540 and 541.

The individual punches 555 of the punching station are supported and aligned within the punching station by a series of guide plates 556, 557 and 558. Guide plate 556 is mounted in fixed position, whereas the two lower guide plates 557 and 558 are supported for vertical movement upon the carriage 160. Carriage 160 is also utilized to support a die plate 560 which is located immediately below guide plate 558 and which defines therewith a slot 561 within which the business forms to be punched are located during the punching operation. A shaft 562 extends across the carriage 160 and is connected to one end of the cam follower arm 158 which carries a cam follower element in engagement with the punch-operating cam 159. The cam follower is pivotally supported at its opposite sides as indicated at 563 and 564 in Fig. 20. As indicated in Figs. 5 and 21, the punch-operating cam 159 is mounted upon the shaft 157, the shaft being driven by the drive chain 155.

The punching station further includes the cam shaft 181 upon which are mounted a cable restoration cam 566 and a punch release cam 567. The punch release cam 567 is engaged by a cam follower 568 supported upon a cam lever 569 which is affixed to a shaft 570. A pair of levers 571 and 572 are affixed to opposite ends of shaft 570, the opposite ends of the two levers being pivotally connected to a pair of punch release tie rods 573 and 574 respectively. The ends of rods 573 and 574 opposite the two levers 571 and 572 are interconnected by a punch release bar 575 which, as indicated in Fig. 21, engages the ends of the detent plates 551; the punch release bar 575 may also be seen in Figs. 2 and 20.

Figure 25:
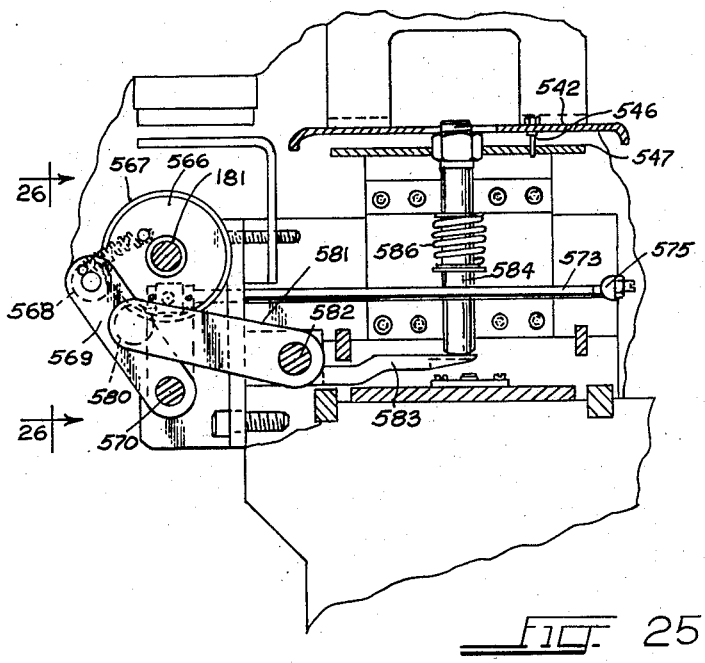
Fig. 25 is a detail sectional view of a portion of the punch station of the machine.

Cable restore cam 566, on the other hand, is engaged by a cam follower 580 supported upon a cam lever 581 which in turn is mounted upon a shaft 582. A cable-restore actuating lever 583 is also affixed to shaft 582 for pivotal movement therewith; actuating lever 583 engages the lower end of a vertically extending rod 584 which engages the guide plate 547. Rod 584 is engaged by and biased toward its normal position as shown in Fig. 25 by a compression spring 586. Preferably, the punch unit is provided with two vertical cable-restoration rods such as rod 584 located at opposite ends of the punch unit.

In many respects, the punch unit illustrated in Figs. 20 and 21 is quite conventional in form and will be recognized as such by those skilled in the art. Consequently, only a relatively brief description of the actual punch structure and operation is included herein. As described hereinabove, sensing of a print order card at the punch-sensing station 49 impels the wire within one of the Bowden cables running through conduit 420 to move to a relatively short distance longitudinally. Movement of one of the cable wires in this direction causes the end 544 of that wire to engage one of the pins 546, as indicated in Fig. 22, and moves that pin downwardly through a relatively short distance. Movement of the pin in this direction engages one of the set-bars 548 to move the bar downwardly through a corresponding distance, where it is maintained in set or actuated position by the engagement of its detent pin 552 in one of the slots of detent plate 551. One set-bar 552A is shown in this actuated or set position in Fig. 21.

After the sensing operation, with all of the desired set-bars 552 in their actuated positions, clutch 153 (Fig. 5) is engaged and drives cam shaft 157 through a complete revolution, the driving connection being afforded by shaft 152 and drive chain 155. As the cam shaft rotates, the cam surfaces thereof engage the cam follower supported upon cam lever 158 and pivot the cam lever about its support shafts 563, 564. This pivotal movement of cam lever 158, which is initiated in a clockwise direction as seen in Fig. 21, causes the extension portion 591 thereof to pivot in the same direction, thereby moving carriage 160 upwardly. The upward movement of carriage 160 raises the punch and die assembly comprising guide plates 556—558 and die plate 560. The punches 555 are free to move with respect to the guide plates; most of the punches contact the business form 63 of web 500 currently positioned in the machine and continue to move upwardly along with the punch and die assembly. Those set-bars 552 which have been moved to their actuated or punch position, however, engage the corresponding punches 555 and prevent continued upward movement thereof. Consequently, any such punch is arrested in its upward movement, whereas the remainder of the punch and die assembly continues to move upwardly, driving the punch through the paper form and into the aperture aligned therewith in die plate 560. Continued rotation of the cam shaft 157 returns the punch unit to its normal position as illustrated in Fig. 21.

Figure 26:
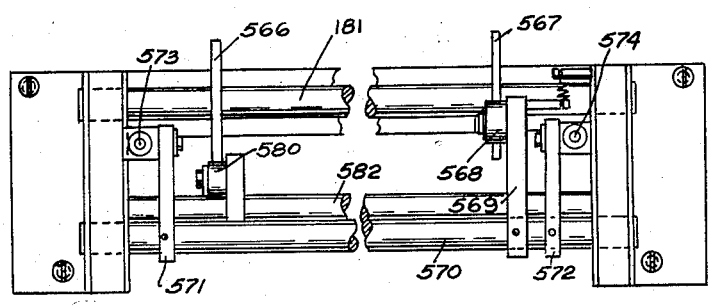
Fig. 26 is an elevation detail view taken along line 26—26 in Fig. 25.

The time relationship of the punch operation with respect to the card-sensing operation which takes place in punch-sensing station 49 is illustrated in Fig. 23. As indicated therein, the punch drive clutch 153 is engaged toward the end of the sensing cycle and its movement is completed well before the beginning of the next sensing cycle. The form feed clutch 177, on the other hand, engages during the early part of the sensing cycle. Engagement of this clutch actuates shaft 181 through a complete cycle in a fractional portion of the sensing period. As shaft 181 rotates, cable restore cam 566 drives cam follower 580 downwardly, as seen in Figs. 25 and 26, thereby actuating the cable restore linkage 581, 583 to drive rod 584 upwardly against the bias afforded by spring 586. Upward movement of the rod 584 raises the guide plate 547 and thereby elevates each of the pins 546 to its normal position and affords a positive restoration action driving the wire 544 in each Bowden cable back to its initial or unactuated position. Rotation of shaft 181 also causes cam 567 to drive cam follower 568 and impel its support lever 569 to rotate shaft 570 in a counterclockwise direction as viewed in Fig. 25. This rotational movement of shaft 570 pulls the tie rods 573 to the left as seen in Fig. 25 and consequently moves the detent bar 575 in the same direction. The detent bar 575, by virtue of its engagement with the ends of detent plates 552, moves the detent plates to the left (Fig. 21) and releases each of the set-bars 548, permitting the set-bars to return to their normal or unactuated position under the biasing force exerted by the springs 54. Thus, the cables and the set-bars are both restored to their normal position during the initial portion of the sensing cycle and well before initiation of the punching cycle (see Fig. 3).

Operation of the form feed clutch 177 also controls the rotation of sprocket 180, which operates to pull the business form web 500 one complete form length through the punching station during the period in which clutch 177 is engaged. Thus, the printed web of forms is cyclically advanced, moving one form length during the initial part of each punch-sensing cycle and remaining completely stationary during the punching cycle.

*Interconnection of punch-sensing and punch stations*

As indicated hereinabove, the second data analysis station of the printing machine, punch-sensing station 49, is connected to the punching device 71 by means of a plurality of Bowden cables 404 which are shown in Figs. 17 and 20 as well as in the perspective views of Figs. 1 and 2. A cross section of the conduit 420 through which the cables 404 extend is shown in Fig. 27. As indicated therein, each of the cables 404 comprises an external sheath or conduit portion 600 encasing a relatively stiff small diameter wire 601. The cables 404 are packed as tightly as possible into the conduit 420 in order to keep the conduit diameter to a minimum and also to limit longitudinal movement of the cables. Moreover, the interior area of the conduit is also packed with some suitable material as indicated at 602; the packing may, for example, comprise a plastic such as a polyurethane or may be formed of lead. This packing 602 effectively inhibits movement of the cables within the conduit and assures positive accurate action of the cable system in transmitting the identification data from sensing station 49 of the printing machine to the punching station 71 thereof.

This particular construction affords a very inexpensive and convenient means for transmitting the desired information between the punch-sense and punch units of the machine and avoids any necessity for complex electrical or mechanical connecting apparatus for these two units. This arrangement has been found to be far superior to any conventional system, whether comprising individual cables or other transmission means, for transmitting the necessary identification data to the punch unit of the printing machine.

*Conclusion*

Although the printing machine described hereinabove represents a preferred embodiment of the invention, it will be readily recognized by those skilled in the art that numerous changes and variations may be made therein without departing in any way from the inventive concept. For example, in some business systems the identication data 44 on the record cards may comprise punched holes distributed in accordance with an entirely different code than that illustrated or may even comprise other types of marking on the record instruments rather than punched holes. Moreover, the punch unit 71 of the machine may be replaced by a marking device which places marks of various types on the business forms such, for example, as magnetic dots or characters of one type or another. Moreover, and as indicated above, substantially different punching devices may be substituted for that shown in accordance with the requirements of the user. In any of these revisions, the very substantial advantages offered by the record instrument transport system may be retained and, in many such modified systems, the cable-conduit arrangement described immediately hereinabove may also afford substantial advantages. Printing machines constructed in accordance with the invention may of course be utilized in the preparation of any form upon which it is desired to reproduce identification data as well as image data; the use of these machines is by no means limited to subscription solicitation procedures of the type outlined hereinabove.

The printing machine described herein affords a high-speed device for printing business instruments or the like and for encoding those instruments with additional information in the form of punched holes or similar identification data. The machine is completely automatic in its operations and effectively maintains the requisite synchronization between all of the various sensing and reproducing functions required. The transport system of the printing machine permits a very substantial reduction in overall machine size and materially simplifies the synchronization of the analyzing and reproducing operations of the machine. The cable and conduit arrangement employed in the machine represents a very substantial improvement over previously known arrangements of this type and affords precise and accurate information transmission in an extremely economical structure.

Hence, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. In a printing machine in which data-bearing record instruments are passed sequentially through first and second data-analysis stations to control the operation of first and second data-responsive devices operatively connected to said first and second data-analysis stations respectively, a record instrument transport system comprising: a first conveyor for transporting the record instruments through the first analysis station at a predetermined velocity; means for sequentially feeding the record instruments to said first conveyor; a second conveyor for receiving the record instruments from the first conveyor and for transporting the instruments between the first and second analysis stations at a predetermined velocity substantially lower than that of the first conveyor; and a third conveyor for receiving the record instruments from the second conveyor and for transporting the instruments through the second analysis station at a velocity very much higher than that of the second conveyor.

2. In a printing machine in which data-bearing record instruments are passed sequentially through an image data analysis station and an identification data analysis station to control the operation of first and second data-responsive devices operatively connected to said image and identification data analysis stations respectively, a record instrument transport system comprising: a first conveyor for transporting the record instruments through the image data analysis station at a predetermined velocity; means for sequentially depositing the record instruments on said first conveyor in partial overlapping relationship with respect to each other; a second conveyor for receiving the record instruments from the first conveyor and for transporting the instruments between the two analysis stations at a predetermined velocity substantially lower than that of the first conveyor; and a third conveyor for receiving the record instruments from the second conveyor and for transporting the instruments through the identification data analysis station at a velocity very much higher than that of the second conveyor to clear each record instrument from overlapping relationship with the subsequent instruments as that instrument traverses the identification data analysis station.

3. In a printing machine in which data-bearing record instruments are passed sequentially through first and second data analysis stations to control the operation of first and second data-responsive devices operatively connected to said first and second data analysis stations respectively, a record instrument transport system comprising: a first conveyor for transporting the record instruments through the first analysis station at a predetermined velocity; means for sequentially feeding the record instruments to said first conveyor; a second conveyor for receiving the record instruments from the first conveyor and for transporting the instruments between the first and second analysis stations at a predetermined velocity substantially lower than that of the first conveyor; a third conveyor for receiving the record instruments from the second conveyor and for transporting the instruments through the second analysis station at a velocity very much higher than that of the second conveyor; and drive means common to all of said conveyors for driving the conveyors in synchronism with each other.

4. In a printing machine in which data-bearing record instruments of a first order are passed sequentially through first and second data analysis stations to control the operation of first and second data-reproducing devices operatively connected to said first and second data analysis stations respectively and in which record instruments of a second order are passed through the data-analysis portion of the machine without being analyzed for data reproduction, a record instrument transport system comprising: a first conveyor for transporting record instruments of the first order through the first analysis station at a predetermined velocity; a second conveyor for receiving the first-order record instruments from the first conveyor and for transporting the instruments between the first and second analysis stations at a predetermined velocity substantially lower than that of the first conveyor; a third conveyor for receiving the first-order record instruments from the second conveyor and for transporting the instruments through the second analysis station at a velocity very much higher than that of the second conveyor; and a fourth conveyor for transporting the second-order instruments through that portion of the machine including the two data-analysis stations at a velocity such that the time required for a second-order instrument to traverse the fourth conveyor is substantially equal to the time required for a first-order instrument to traverse the first, second and third conveyors.

5. In a printing machine in which data-bearing record instruments of a first order are passed sequentially through first and second data analysis stations to control the operation of first and second data-reproducing devices operatively connected to said first and second data analysis stations respectively and in which record instruments of a second order are passed through the data-analysis portion of the machine without being analyzed for data reproduction, a record instrument transport system comprising: a first conveyor for transporting record instruments of the first order through the first analysis station at a predetermined velocity; a second conveyor for receiving the first-order record instruments from the first conveyor and for transporting the instruments between the first and second analysis stations at a predetermined velocity substantially lower than that of the first conveyor; a third conveyor for receiving the first-order record instruments from the second conveyor and for transporting the instruments through the second analysis station at a velocity very much higher than that of the second conveyor; a fourth conveyor for transporting the second-order instruments through that portion of the machine including the two data-analysis stations at a velocity such that the time required for a second-order instrument to traverse the fourth conveyor is substantially equal to the time required for a first-order instrument to traverse the first, second, and third conveyors; and means for sequentially feeding record instruments of the first order to the first conveyor and for simultaneously feeding record instruments of the second order to the fourth conveyor, whereby the record instruments are discharged from the machine in substantially the same sequence as that in which they enter the machine.

6. In a printing machine in which data-bearing record instruments of a first order are passed sequentially through first and second data-analysis stations to control the operation of first and second data-reproducing devices operatively connected to said first and second data-analysis stations respectively and in which record instruments of a second order are passed through the data-analysis portion of the machine without being analyzed for data reproduction, a record instrument transport system comprising: a first conveyor for transporting record instruments of the first order through the first analysis station at a predetermined velocity; a second conveyor for receiving the first-order record instruments from the first conveyor and for transporting the instruments between the first and second analysis stations at a predetermined velocity substantially lower than that of the first conveyor; a third conveyor for receiving the first-order record instruments from the second conveyor and for transporting the instruments through the second analysis station at a velocity very much higher than that of the second conveyor; a fourth conveyor for transporting the second-order instruments through that portion of the machine including the two data-analysis stations at a velocity such that the time required for a second-order instrument to traverse the fourth conveyor is substantially equal to the time required for a first-order instrument to traverse the first, second, and third conveyors; data-responsive selector means for segregating the record instruments according to order; and means for sequentially feeding record instruments of the first order from the selector means to the first conveyor and for simultaneously feeding record instruments of the second order from the selector means to the fourth conveyor, whereby the record instruments are discharged from the machine in the same sequence as that in which they enter the machine.

7. In a printing machine in which data-bearing record instruments of a first order are passed sequentially through an image data analysis station and through an identification data analysis station to control the operation of printing and punching devices operatively connected to said image and identification data analysis stations respectively and in which record instruments of a second order are passed through the data-analysis portion of the machine without being analyzed for data reproduction, a record instrument transport system comprising: a first conveyor for transporting record instruments of the first order through the image analysis station at a predetermined velocity; a second conveyor for receiving the first-order record instruments from the first conveyor and for transporting the instruments between the two analysis stations at a predetermined velocity substantially lower than that of the first conveyor; a third conveyor for receiving the first-order record instruments from the second conveyor and for transporting the instruments through the identification analysis station at a velocity very much higher than that of the second conveyor; a fourth conveyor for transporting the second-order instruments through that portion of the machine including the two data-analysis stations at a velocity such that the time required for a second-order instrument to traverse the fourth conveyor is substantially equal to the time required for a first-order instrument to traverse the first, second, and third conveyors; data-responsive selector means for segregating the record instruments according to order; means for sequentially feeding record instruments of the first order to the first conveyor and simultaneously feeding record instruments of the second order to the fourth conveyor, whereby the record instruments are discharged from the machine is substantially the same order as that in which they entered the machine; and common drive means for actuating all of said conveyors in synchronism with each other.

8. In a printing machine in which data-bearing record instruments are passed sequentially through first and second data-analysis stations to control the operation of first and second data-reproducing devices, operatively connected to said first and second data-analysis stations respectively, which reproduce selected portions of the record instrument data on a continuous data-receiving web of paper or the like, a transport system comprising: a first conveyor for transporting the record instruments through the first analysis station at a predetermined velocity; means for sequentially feeding the record instruments to the first conveyor; a second conveyor for receiving the record instruments from the first conveyor and for transporting the instruments to the second analysis station at a velocity substantially lower than that of the first conveyor to delay passage thereof between the two analysis stations; a third conveyor for receiving the record instruments from the second conveyor and for transporting the instruments through the second analysis station at a velocity substantially higher than that of the second conveyor; a first web-feeding device for feeding the data-receiving web through the first data-reproducing device at a predetermined velocity; a second web-feeding device for cyclically feeding the data-receiving web through the second data-reproducing device at a velocity substantially higher than the first web-feeding device; and web-storage means interposed between the first and second web-feeding devices for storing said web between cycles of operation of said second web-feeding device.

9. In a printing machine in which data-bearing record instruments are passed sequentially through an image data analysis station and an identification data analysis station to control the operation of printing and punching devices, operatively connected to said image identification data-analysis stations respectively, which reproduce selected portions of the record instrument data on a continuous data-receiving web of paper or the like, a transport system comprising: a first conveyor for transporting the record instruments through the image analysis station at a predetermined velocity; means for sequentially feeding the record instruments to the first conveyor; a second conveyor for receiving the record instruments from the first conveyor and for transporting the instruments to the identification analysis station at a velocity substantially lower than that of the first conveyor to delay passage thereof between the two analysis stations; a third conveyor for receiving the record instruments from the second conveyor and for transporting the instruments through the identification analysis station at a velocity substantially higher than that of the second conveyor; means for arresting movement of each record instrument within the identification analysis station for a predetermined sensing interval; a first web-feeding device for feeding the data-receiving web through the printing device at a predetermined velocity; a second web-feeding device for cyclically feeding the data-receiving web through the punching device at a velocity substantially higher than the first web-feeding device; and web-storage means interposed between the first and second web-feeding devices for storing said web between cycles of operation of said second web-feeding device.

10. In a printing machine adapted to reproduce both image data and identification data from a record instrument, an identification data reproducing system comprising: a data-analyzing station including a plurality of contact pins individually movable from a normal position to an actuating position in accordance with the identification data carried by a given record instrument; an identification data reproducing station including a corresponding plurality of actuation pins individually movable from a normal position to an actuated position; a corresponding plurality of cables extending between said stations to engage corresponding ones of said contact and actuation pins, said cables each including a sheath portion and a wire longitudinally movable within the sheath; a conduit encompassing said cables; and packing means within said conduit effectively preventing movement of the sheath portions of said cables with respect to said conduit.

11. In a printing machine adapted to reproduce both image data and identification data from a record instrument, an identification data reproducing system comprising: a data-analyzing station including a plurality of contact pins individually movable from a normal position to an actuating position in accordance with the identification data carried by a given record instrument; an identification data reproducing station including a corresponding plurality of actuation pins individually movable from a normal position to an actuated position; a corresponding plurality of cables extending between said stations to engage corresponding ones of said contact and actuation pins, said cables each including a sheath portion and a wire longitudinally movable within the sheath; and a conduit encompassing said cables, said cables being tightly packed within the conduit to prevent relative movement of the sheath portions thereof with respect to the conduit.

12. In a printing machine adapted to reproduce both image data and punched-hole identification data from a record instrument, an identification data reproducing system comprising: a data-analyzing station including a plurality of contact pins individually movable from a normal position to an actuating position in accordance with the identification data apertures in a given record instrument; a punching station including a corresponding plurality of punch-actuation pins individually movable from a normal inactive position to a punch-actuating position; a corresponding plurality of cables extending between said stations to engage corresponding ones of said contact and actuation pins, said cables each including a sheath and a wire longitudinally movable within the sheath; a conduit encompassing said cables; and packing means within said conduit effectively filling the space between cables within the conduit to prevent movement of the sheaths of said cables with respect to said conduit.

13. In a printing machine adapted to reproduce both image data and identification data from a record instrument, an identification data reproducing system comprising: a data-analyzing station including a plurality of contact pins individually movable from a normal position to an actuating position and a corresponding plurality of sensing pins for sensing the data carried by a record instrument and for engaging the contact pins to move the contact pins to actuating position in accordance with the identification data carried by a given record instrument; an identification data reproducing station including a corresponding plurality of actuation pins individually movable from a normal position to an actuated position and a corresponding plurality of data marking devices, individually associated with and actuated by the actuation pins, for marking a sheet of paper or the like; a corresponding plurality of cables extending between said stations to engage corresponding ones of said contact and actuation pins, said cables each including a sheath portion and a wire longitudinally movable within the sheath; a conduit encompassing said cables; and packing means within said conduit effectively preventing movement of the sheath portions of said cables with respect to said conduit.

14. In a printing machine adapted to reproduce on a business instrument both image data and punched-hole identification data from a record instrument, an identification data reproducing system comprising: a data-analyzing station including a plurality of contact pins individually movable from a normal position to an actuating position and means for moving selected ones of said pins to actuating position in accordance with the identification data carried by a given record instrument; a reproducing punch device including a corresponding plurality of actuation pins individually movable from a normal position to an actuated position and a corresponding plurality of punches, individually associated with and actuated by the actuation pins, for punching identification data holes in the business instrument; a corresponding plurality of cables extending between said stations to engage corresponding ones of said contact and actuating pins, said cables each including a sheath portion and a wire longitudinally movable within the sheath; a conduit encompassing said cables; and packing means within said conduit effectively preventing movement of the sheath portions of said cables with respect to said conduit.

15. In a printing machine in which data-bearing record instruments are passed sequentially through first and second data-analysis stations to control the operation of first and second data-responsive devices operatively connected to said first and second data-analysis stations respectively, a record instrument transport system comprising: a first conveyor for transporting the record instruments sequentially through the first analysis station at a predetermined velocity; a second conveyor for receiving the record instruments from the first conveyor and for transporting the instruments between the first and second analysis stations at a predetermined velocity substantially lower than that of the first conveyor; a third conveyor for receiving the record instruments from the second conveyor and for transporting the instruments through the second analysis station at a velocity very much higher than that of the second conveyor.

16. A printing machine adapted to reproduce both image data and identification data borne by record instruments upon a corresponding series of business instruments comprising: an image data analysis station; a first conveyor for transporting the record instruments one by one through the image data analysis station at a predetermined velocity; an identification data analyzing station including a plurality of contact pins individually movable from a normal position to an actuating position in accordance with the identification data carried by a record instrument; a second conveyor for receiving the record instruments from the first conveyor and for transporting the instruments between the two analysis stations at a predetermined lower velocity; a third conveyor for receiving the record instruments from the second conveyor and for transporting the instruments through the identification data analysis station at a substantially higher velocity than that of the second conveyor; an identification data reproducing station including a corresponding plurality of actuation pins individually movable from a normal position to an actuated position; a conduit interconnecting said identification data analyzing and reproducing stations; and a corresponding plurality of cables extending between the two identification data stations and engaging corresponding ones of the contact and actuation pins, said cables each including a wire longitudinally movable within a sheath and being packed within said conduit in a manner to prevent movement of the cable sheaths with respect to the conduit.

17. A printing machine adapted to reproduce both image data and identification data borne by record instruments upon a corresponding series of business instrument comprising: an image data analysis station; a first conveyor for transporting the record instruments one by one in partially overlapped relation through the image data analysis station at a predetermined velocity; an identification data analyzing station including a plurality of contact pins individually movable from a normal position to an actuating position in accordance with the identification data carried by a record instrument; a second conveyor for receiving the record instruments from the first conveyor and for transporting the instruments between the two analysis stations at a predetermined lower velocity; a third conveyor for receiving the record instruments from the second conveyor and for transporting the instruments through the identification data analysis station at a substantially higher velocity than that of the second conveyor to clear each record instrument from overlapping relationship with other instruments as that instrument traverses the identification data station; an identification data reproducing station including a corresponding plurality of actuation pins individually movable from a normal position to an actuated position; a conduit interconnecting said identification data analyzing and reproducing stations; and a corresponding plurality of cables extending between the two identification data stations and engaging corresponding ones of the contact and actuation pins, said cables each including a wire longitudinally movable within a sheath and being packed within said conduit in a manner to prevent movement of the cable sheaths with respect to the conduit.

18. A printing machine adapted to reproduce both image data and identification data borne by record instruments upon a corresponding series of business instruments comprising: an image data analysis station; a first conveyor for transporting the record instruments one by one through the image data analysis station at a predetermined velocity; an identification data analyzing station including a plurality of contact pins individually movable from a normal position to an actuating position in accordance with the identification data carried by a record instrument; a second conveyor for receiving the record instruments from the first conveyor and for transporting the instruments between the two analysis stations at a predetermined lower velocity; a third conveyor for receiving the record instruments from the second conveyor and for transporting the instruments through the identification data analysis station at a substantially higher velocity than that of the second conveyor; means for interrupting movement of each record instrument within the identification data analyzing station for a predetermined time interval to permit simultaneous analysis of all identification data borne by the record instrument; an identification data reproducing station including a corresponding plurality of actuation pins individually movable from a normal position to an actuated position; a conduit interconnecting said identification data analyzing and reproducing stations; and a corresponding plurality of cables extending between the two identification data stations and engaging corresponding ones of the contact and actuation pins, said cables each including a wire longitudinally movable within a sheath and being packed within said conduit in a manner to prevent movement of the cable sheaths with respect to the conduit.

19. A printing machine adapted to reproduce both image data and identification data borne by record instruments upon a corresponding series of business instruments comprising: an image data analysis station; a first conveyor for transporting the record instruments one by one through the image data analysis station at a predetermined velocity; an identification data analyzing station including a plurality of contact pins individually movable from a normal position to an actuating position in accordance with the identification data carried by a record instrument; a second conveyor for receiving the record instruments from the first conveyor and for transporting the instruments between the two analysis stations at a predetermined lower velocity; a third conveyor for receiving the record instruments from the second conveyor and for transporting the instruments through the identification data analysis station at a substantially higher velocity than that of the second conveyor; stop means actuatable from an inactive position to a stop position to interrupt movement of each record instrument within the identification data analyzing station for a predetermined time interval to permit simultaneous analysis of all identification data borne by the record instrument; actuating means, operatively connected to both said identification data analyzing station and said stop means, for actuating said contact pins and said stop means in predetermined time relation to each other; an identification data reproducing station including a corresponding plurality of actuation pins individually movable from a normal position to an actuated position; a conduit interconnecting said identification data analyzing and reproducing stations; and a corresponding plurality of cables extending between the two identification data stations and engaging corresponding ones of the contact and actuation pins, said cables each including a wire longitudinally movable within a sheath and being packed within said conduit in a manner to prevent movement of the cable sheaths with respect to the conduit.

20. A printing machine adapted to reproduce both image data and identification data borne by record instruments upon a corresponding series of business instruments comprising: an image data analysis station; a first conveyor for transporting the record instruments one by one through the image data analysis station at a predetermined velocity; an identification data analyzing station including a plurality of contact pins individually movable from a normal position to an actuating position in accordance with the identification data carried by a record instrument; a second conveyor for receiving the record instruments from the first conveyor and for transporting the instruments between the two analysis stations at a predetermined lower velocity; a third conveyor for receiving the record instruments from the second conveyor and for transporting the instruments through the identification data analysis station at a substantially higher velocity than that of either of the first and second conveyors; an identification data reproducing station including a corresponding plurality of actuation pins individually movable from a normal position to an actuated position; a conduit interconnecting said identification data analyzing and reproducing stations; a corresponding plurality of cables extending through said conduit between the two identification data stations and engaging corresponding ones of the contact and actuation pins, said cables each including a wire longitudinally movable within a sheath; and packing means within said conduit for preventing relative movement between the conduit and the cable sheaths.

21. A printing machine adapted to reproduce both printed image data and punched-hole identification data borne by record instruments upon a corresponding series of business instruments comprising: a facsimile scanning station; a first conveyor for transporting the record instruments one by one through the scanning station at a predetermined velocity; a sensing station including a plurality of contact pins individually movable from a normal position to an actuating position in accordance with the punched-hole identification data in a record instrument; a second conveyor for receiving the record instruments from the first conveyor and for transporting the instruments between the scanning and sensing stations at a predetermined lower velocity; a third conveyor for receiving the record instruments from the second conveyor and for transporting the instruments through the sensing station at a substantially higher velocity than that of either the first or second conveyors; a facsimile printing station operatively connected to and controlled by said scanning station; means for feeding a web of business instruments at substantially constant velocity through said printing station; a punching station including a corresponding plurality of punch-actuation pins individually movable from a normal position to an actuated position; means for feeding said web of business forms through said punching station in cyclic manner; a conduit interconnecting said identification data analyzing and reproducing stations; and a corresponding plurality of cables extending between the two identification data stations and engaging corresponding ones of the contact and actuation pins, said cables each including a wire longitudinally movable within a sheath and being packed within said conduit in a manner to prevent movement of the cable sheaths with respect to the conduit.

22. In a printing machine in which data-bearing record instruments are passed sequentially through first and second data analysis stations to control the operation of first and second data-responsive devices operatively connected to said first and second data analysis stations respectively, a record instrument transport system comprising: a first conveyor for transporting the record instruments sequentially through the first analysis station at a predetermined velocity; a second conveyor for receiving the record instruments from the first conveyor and for transporting the instruments between the first and second analysis stations at a predetermined velocity substantially lower than that of the first conveyor; a third conveyor for receiving the record instruments from the second conveyor and for transporting the instruments through the second analysis station at a velocity very much higher than that of the second conveyor; and drive means common to all of said conveyors for driving the conveyors in synchronism with each other.

23. In a printing machine in which data-bearing record instruments are passed sequentially through first and second data-analysis stations to control the operation of first and second data-reproducing devices, operatively connected to said first and second data-analysis stations respectively, which reproduce selected portions of the record instrument data on a continuous data-receiving web of paper or the like, a transport system comprising: a first conveyor for sequentially transporting the record instruments through the first analysis station at a predetermined velocity; a second conveyor for receiving the record instruments from the first conveyor and for transporting the instruments to the second analysis station at a velocity substantially lower than that of the first conveyor to delay passage thereof between the two analysis stations; a third conveyor for receiving the record instruments from the second conveyor and for transporting the instruments through the second analysis station at a velocity substantially higher than that of either the first or the second conveyor; a first web-feeding device for feeding the data-receiving web through the first data-reproducing device at a predetermined velocity; a second web-feeding device for cyclically feeding the data-reproducing device at a velocity substantially higher than the first web-feeding device; and web-storage means interposed between the first and second web-feeding devices for storing said web between cycles of operation of said second web-feeding device.

No references cited.